(12) United States Patent
Hirose et al.

(10) Patent No.: US 9,583,766 B2
(45) Date of Patent: Feb. 28, 2017

(54) BATTERY ANODE ACTIVE MATERIAL WITH FLUORINE RESIN COATING

(71) Applicant: Sony Corporation, Tokyo (JP)

(72) Inventors: Takakazu Hirose, Fukushima (JP); Hideki Nakai, Fukushima (JP); Kenichi Kawase, Fukushima (JP); Hiroyuki Yamaguchi, Fukushima (JP); Tadahiko Kubota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 90 days.

(21) Appl. No.: 14/550,622

(22) Filed: Nov. 21, 2014

(65) Prior Publication Data

US 2015/0079468 A1   Mar. 19, 2015

Related U.S. Application Data

(62) Division of application No. 12/262,301, filed on Oct. 31, 2008, now Pat. No. 8,932,756.

(30) Foreign Application Priority Data

Oct. 31, 2007   (JP) ................................ 2007-283080

(51) Int. Cl.
  *H01M 6/04*   (2006.01)
  *H01M 4/62*   (2006.01)
  *H01M 4/133*  (2010.01)
  *H01M 4/134*  (2010.01)
  *H01M 4/139*  (2010.01)
  *H01M 4/36*   (2006.01)
  *H01M 10/052* (2010.01)
  *H01M 10/0567* (2010.01)
  *H01M 10/0568* (2010.01)
  *H01M 4/38*   (2006.01)
  *H01M 4/04*   (2006.01)
  (Continued)

(52) U.S. Cl.
  CPC ............. *H01M 4/62* (2013.01); *H01M 4/133* (2013.01); *H01M 4/134* (2013.01); *H01M 4/139* (2013.01); *H01M 4/366* (2013.01); *H01M 4/38* (2013.01); *H01M 10/052* (2013.01); *H01M 10/0567* (2013.01); *H01M 10/0568* (2013.01);
  (Continued)

(58) Field of Classification Search
  CPC ........ H01M 4/62; H01M 4/133; H01M 4/134; H01M 4/139; H01M 4/366; H01M 4/38; H01M 4/0471; H01M 4/70; H01M 10/052; H01M 10/0567; H01M 10/0568; H01M 2004/027; H01M 2220/30; Y02E 60/122
  See application file for complete search history.

(56) References Cited

U.S. PATENT DOCUMENTS

2003/0113625 A1*  6/2003  Kim ...................... H01M 4/623
                                                    429/217
2006/0191794 A1*  8/2006  Jarvis .................. H01M 4/0402
                                                    205/59
(Continued)

FOREIGN PATENT DOCUMENTS

JP   HEI 11-297360    10/1999
JP   2002-110164       4/2002
(Continued)

OTHER PUBLICATIONS

Japanese Office Action issued in connection with related Japanese Patent Application No. 2007-283080 dated Aug. 14, 2012.

*Primary Examiner* — Raymond Alejandro
(74) *Attorney, Agent, or Firm* — Dentons US LLP

(57) ABSTRACT

Battery anode active material with fluorine resin coating. A terminal of the fluorine resin is a hydroxyl group or the like capable of being fixed (for example, being absorbed or bound) on the surface of the anode active material layer (anode active material).

17 Claims, 14 Drawing Sheets

(51) Int. Cl.
  *H01M 4/70* (2006.01)
  *H01M 4/02* (2006.01)

(52) U.S. Cl.
  CPC ............ *H01M 4/0471* (2013.01); *H01M 4/70* (2013.01); *H01M 2004/027* (2013.01); *H01M 2220/30* (2013.01); *Y02E 60/122* (2013.01)

(56) References Cited

U.S. PATENT DOCUMENTS

| | | |
|---|---|---|
| 2007/0117024 A1 | 5/2007 | Nakai et al. |
| 2007/0218356 A1* | 9/2007 | Kawamura ............ H01M 4/134 429/209 |
| 2008/0138714 A1 | 6/2008 | Ihara et al. |

FOREIGN PATENT DOCUMENTS

| | | | | |
|---|---|---|---|---|
| JP | 2004-265609 | 9/2004 | | |
| JP | 2004-311141 | 11/2004 | | |
| JP | 2005-141992 | 6/2005 | | |
| JP | 2005-536860 | 12/2005 | | |
| JP | 2006-196447 | 7/2006 | | |
| JP | 2006-269216 | 10/2006 | | |
| JP | 2006-269374 | 10/2006 | | |
| JP | 2006-324210 | 11/2006 | | |
| JP | 2007-128765 | 5/2007 | | |
| JP | 2007-207439 | 8/2007 | | |
| WO | WO 2006/011290 | * | 2/2006 | ............ H01M 4/02 |
| WO | WO/2006/011290 | 2/2006 | | |
| WO | WO/2006/030632 | 3/2006 | | |
| WO | WO/2007/052803 | 5/2007 | | |
| WO | WO/2007/086411 | 8/2007 | | |

* cited by examiner

BATTERY ANODE ACTIVE MATERIAL WITH FLUORINE RESIN COATING

CROSS REFERENCES TO RELATED APPLICATIONS

This application is a division of U.S. patent application Ser. No. 12/262,301 filed Oct. 31, 2008, now U.S. Pat. No. 8,932,756 issued Jan. 13, 2015, the entirety of which is incorporated herein by reference to the extent permitted by law. The present invention contains subject matter related to Japanese Patent Application JP 2007-283080 filed in the Japanese Patent Office on Oct. 31, 2008, the entire contents of which being incorporated herein by reference.

BACKGROUND OF THE INVENTION

1. Field of the Invention

The present invention relates to an anode having an anode active material layer on an anode current collector and a battery including the anode.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery can provide a higher energy density compared to a lead battery and a nickel cadmium battery. The lithium ion secondary battery has a cathode, an anode, and an electrolytic solution. The anode has an anode active material layer on an anode current collector.

As an anode active material contained in the anode active material layer, a carbon material such as graphite has been widely used. In recent years, as the high performance and the multi functions of the portable electronic devices are developed, further improvement of the battery capacity is demanded. Thus, it has been considered to use silicon, tin or the like instead of the carbon material. Since the theoretical capacity of silicon (4199 mAh/g) and the theoretical capacity of tin (994 mAh/g) are significantly higher than the theoretical capacity of graphite (372 mAh/g), it is prospected that the battery capacity is thereby highly improved.

However, in the case where silicon or the like is used as the anode active material, the anode active material inserting lithium when charged is highly activated. Thus, the electrolytic solution is easily decomposed, and lithium is easily inactivated. Thereby, the discharge capacity is lowered when charge and discharge are repeated, and thus sufficient cycle characteristics are hardly obtained.

Therefore, in the case where silicon or the like is used as the anode active material, various devices have been invented as well to improve the cycle characteristics. Specifically, a technique that perfluoro polyether is contained in the electrolytic solution (for example, refer to Japanese Unexamined Patent Application Publication Nos. 2002-305023 and 2006-269374), and a technique that a coat containing perfluoro polyether is provided on the surface of an anode (for example, refer to Japanese Unexamined Patent Application Publication No. 2004-265609) have been proposed. In addition, a technique that an anode is covered with a polymer material such as a homopolymer or a copolymer of vinylidene fluoride (for example, refer to Japanese Unexamined Patent Application Publication No. 2006-517719) has been proposed.

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics tend to be easily lowered. Therefore, further improvement of the cycle characteristics of the secondary battery has been aspired.

In view of the foregoing, in the invention, it is desirable to provide an anode and a battery capable of improving the cycle characteristics.

According to an embodiment of the invention, there is provided an anode including a coat on an anode active material layer provided on an anode current collector, wherein the coat contains at least one selected from the group consisting of fluorine resins having a structure shown in Chemical formula 1 or Chemical formula 2.

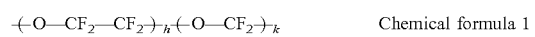

Chemical formula 1

(h and k represent a ratio, and h+k is 1.)

Chemical formula 2

(m and n represent a ratio, and m+n is 1.)

According to an embodiment of the invention, there is provided a battery including a cathode and an anode opposed to each other with a separator in between and an electrolytic solution, wherein at least one of the cathode, the anode, the separator, and the electrolytic solution contains at least one selected from the group consisting of fluorine resins having a structure shown in Chemical formula 1 or Chemical formula 2.

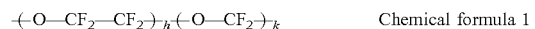

Chemical formula 1

(h and k represent a ratio, and h+k is 1.)

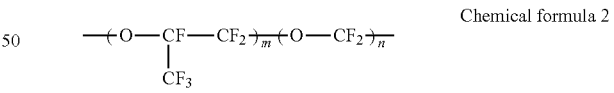

Chemical formula 2

(m and n represent a ratio, and m+n is 1.)

According to the anode of the embodiment of the invention, since the coat provided on the anode active material layer contains at least one selected from the group consisting of the fluorine resins having the structure shown in Chemical formula 1 or Chemical formula 2, the electrochemical stability is improved. The same is applied to a case that at least one of the cathode, the anode, the separator, and the electrolytic solution contains at least one selected from the group consisting of the fluorine resins having the structure shown in Chemical formula 1 or Chemical formula 2 in the battery of the embodiment of the invention. Thereby, according to the battery of the embodiment of the invention, decomposition reaction of the electrolytic solution can be prevented even when charge and discharge are repeated. As a result, the cycle characteristics can be improved.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
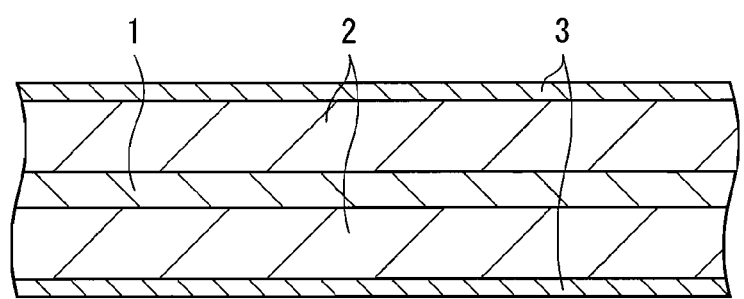
FIG. 1 is a cross section showing a structure of an anode according to an embodiment of the invention.

FIG. 1 shows a cross sectional structure of an anode according to an embodiment of the invention. The anode is used, for example, for an electrochemical device such as a battery. The anode has an anode current collector 1 having a pair of faces, an anode active material layer 2 provided on the anode current collector 1, and a coat 3 provided on the anode active material layer 2.

The anode current collector 1 is preferably made of a metal material having favorable electrochemical stability, favorable electric conductivity, and favorable mechanical strength. As such a metal material, for example, copper (Cu), nickel (Ni), stainless or the like is cited. Specially, copper is preferable since a high electric conductivity can be thereby obtained.

In particular, the foregoing metal material preferably contains one or more metal elements not forming an intermetallic compound with an electrode reactant. When the intermetallic compound is formed with the electrode reactant, lowering of the current collectivity characteristics and separation of the anode active material layer 2 from the anode current collector 1 may occur, being affected by a stress due to expansion and shrinkage of the anode active material layer 2 while the electrochemical device is operated (for example, when a battery is charged and discharged). As the foregoing metal element, for example, copper, nickel, titanium (Ti), iron (Fe), chromium (Cr) or the like is cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is hardly separated from the anode current collector 1. As a metal element that does not form an intermetallic compound with the electrode reactant and is alloyed with the anode active material layer 2, for example, in the case that the anode active material layer 2 contains silicon as an anode active material, copper, nickel, iron or the like is cited. These metal elements are preferable in terms of the strength and the electric conductivity.

The anode current collector 1 may have a single layer structure or a multilayer structure. In the case where the anode current collector 1 has the multilayer structure, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the contact characteristics between the anode current collector 1 and the anode active material layer 2 are improved. In this case, it is enough that at least the surface of the anode current collector 1 in the region opposed to the anode active material layer 2 is roughened. As a roughening method, for example, a method of forming fine particles by electrolytic treatment and the like are cited. The electrolytic treatment is a method of providing concavity and convexity by forming fine particles on the surface of the anode current collector 1 by electrolytic method in an electrolytic bath. A copper foil provided with the electrolytic treatment is generally called "electrolytic copper foil."

Ten points average height of roughness profile Rz of the surface of the anode current collector 1 is not particularly limited, but is preferably 1.5 μm or more and 6.5 μm or less, since thereby the contact characteristics between the anode current collector 1 and the anode active material layer 2 are further improved. More specifically, if the ten points average height of roughness profile Rz is smaller than 1.5 μm, there is a possibility that sufficient contact characteristics are not able to be obtained. Meanwhile, if the ten points average height of roughness profile Rz is larger than 6.5 μm, there is a possibility that many holes are included in the anode active material layer 2 and thereby the surface area is increased.

The anode active material layer 2 contains, as an anode active material, one or more anode materials capable of inserting and extracting an electrode reactant, and may also contain other materials such as an electrical conductor and a binder according to needs. The anode active material layer 2 may be provided on the both faces of the anode current collector 1, or may be provided on only a single face of the anode current collector 1.

As the anode material capable of inserting and extracting the electrode reactant, for example, a material that is capable of inserting and extracting the electrode reactant and contains at least one of metal elements and metalloid elements as an element is cited. Such an anode material is preferably used, since a high energy density can be thereby obtained. Such an anode material may be a simple substance, an alloy, or a compound of a metal element or a metalloid element, or may have one or more phases thereof at least in part. In the invention, "the alloy" includes an alloy containing one or more metal elements and one or more metalloid elements, in addition to an alloy composed of two or more metal elements. Further, "the alloy" may contain a nonmetallic element. The texture thereof includes a solid solution, a eutectic crystal (eutectic mixture), an intermetallic compound, and a texture in which two or more thereof coexist.

As such a metal element or such a metalloid element, for example, a metal element or a metalloid element capable of forming an alloy with the electrode reactant is cited. Specifically, magnesium (Mg), boron (B), aluminum (Al), gallium (Ga), indium (In), silicon, germanium (Ge), tin, lead (Pb), bismuth (Bi), cadmium (Cd), silver (Ag), zinc, hafnium (Hf), zirconium (Zr), yttrium (Y), palladium (Pd), platinum (Pt) and the like are cited. Specially, at least one of silicon and tin is preferably used, and silicon is more preferably used, since silicon and tin have the high ability to insert and extract the electrode reactant, and thus can provide a high energy density.

As the anode material containing at least one of silicon and tin, for example, the simple substance, an alloy, or a compound of silicon; the simple substance, an alloy, or a compound of tin; or a material having one or more phases thereof at least in part is cited. Each thereof may be used singly, or a plurality thereof may be used by mixture.

As the alloy of silicon, for example, an alloy containing at least one selected from the group consisting of tin, nickel, copper, iron, cobalt, manganese, zinc, indium, silver, titanium, germanium, bismuth, antimony (Sb), and chromium as the second element other than silicon is cited. As the compound of silicon, for example, a compound containing oxygen or carbon (C) is cited, and the compound of silicon may contain the foregoing second element in addition to silicon. Examples of an alloy or a compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), LiSiO and the like are cited.

As the alloy of tin, for example, an alloy containing at least one selected from the group consisting of silicon, nickel, copper, iron, cobalt, manganese, zinc, indium, silver, titanium, germanium, bismuth, antimony, and chromium as the second element other than tin is cited. As the compound of tin, for example, a compound containing oxygen or carbon is cited, and may contain the foregoing second element in addition to tin. Examples of an alloy or a compound of tin include $SnSiO_3$, $LiSnO$, $Mg_2Sn$ and the like.

In particular, as the anode material containing at least one of silicon and tin, for example, an anode material containing the second element and the third element in addition to tin as the first element is preferable. As the second element, at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon is cited. As the third element, at least one selected from the group consisting of boron, carbon, aluminum, and phosphorus (P) is cited. In the case where the second element and the third element are contained, the cycle characteristics are improved.

Specially, an SnCoC-containing material that contains tin, cobalt, and carbon as an element in which the carbon content is 9.9 wt % or more and 29.7 wt % or less, and the cobalt ratio to the total of tin and cobalt (Co/(Sn+Co)) is 30 wt % or more and 70 wt % or less is preferable. In such a composition range, a high energy density is obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effects are obtained.

The SnCoC-containing material has a phase containing tin, cobalt, and carbon. Such a phase preferably has a low crystalline structure or an amorphous structure. Further, in the SnCoC-containing material, at least part of carbon as an element is preferably bonded to a metal element or a metalloid element as other element. Cohesion or crystallization of tin or the like is thereby prevented.

The SnCoC-containing material can be formed by, for example, mixing raw materials of each element, dissolving the resultant mixture in an electric furnace, a high frequency induction furnace, an arc melting furnace or the like and then solidifying the resultant. Otherwise, the SnCoC-containing material can be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material can have a low crystalline structure or an amorphous structure. For the method using the mechanochemical reaction, for example, a manufacturing apparatus such as a planetary ball mill apparatus and an attliter is used.

As a measurement method for examining bonding state of elements, for example, X-ray Photoelectron Spectroscopy (XPS) is used. In XPS, in the case of graphite, the peak of is orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, in the case where carbon is bonded to a metal element or a metalloid element, the peak of C1s is observed in the region lower than 284.5 eV. That is, in the case where the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the SnCoC-containing material. Therefore, for example, by analyzing the waveform with the use of commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The anode active material layer 2 using the simple substance, an alloy, or a compound of silicon; the simple substance, an alloy, or a compound of tin; or a material having one or more phases thereof at least in part as an anode material is formed by, for example, vapor-phase deposition method, liquid-phase deposition method, spraying method, coating method, firing method, or a combination of two or more of these methods. In this case, the anode current collector 1 and the anode active material layer 2 are preferably alloyed in at least part of the interface thereof. Specifically, at the interface thereof, the element of the anode current collector 1 may be diffused in the anode active material layer 2; or the element of the anode active material layer 2 may be diffused in the anode current collector 1; or these elements may be diffused in each other. Thereby, destruction due to expansion and shrinkage of the anode active material layer 2 in charge and discharge is prevented, and the electron conductivity between the anode current collector 1 and the anode active material layer 2 is improved.

As vapor-phase deposition method, for example, physical deposition method or chemical deposition method is cited. Specifically, vacuum evaporation method, sputtering method, ion plating method, laser ablation method, thermal CVD (Chemical Vapor Deposition) method, plasma CVD method and the like are cited. As liquid-phase deposition method, a known technique such as electrolytic plating and electroless plating is used. Coating method is, for example, a method in which a particulate anode active material mixed with a binder or the like is dispersed in a solvent and the anode current collector is coated with the resultant. Firing method is, for example, a method in which the anode current collector is coated by coating method, and then heat treatment is provided at a temperature higher than the melting point of the binder or the like. For firing method, a known technique such as atmosphere firing method, reactive firing method, and hot press firing method is available as well.

In addition to the foregoing anode material, as the anode material capable of inserting and extracting the electrode reactant, for example, a carbon material is cited. As the carbon material, for example, graphitizable carbon, non-graphitizable carbon in which the spacing of (002) plane is 0.37 nm or more, graphite in which the spacing of (002) plane is 0.34 nm or less and the like are cited. More specifically, pyrolytic carbons, coke, glassy carbon fiber, an organic polymer compound fired body, activated carbon, carbon black or the like is cited. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, the crystal structure change associated with insertion and extraction of the electrode reactant is very little. Therefore, by using the carbon material, a high energy density is obtained and superior cycle characteristics are obtained. In addition, the carbon material also functions as an electrical conductor, and thus the carbon material is preferably used. The shape of the carbon material may be any of a fibrous shape, a spherical shape, a granular shape, and a scale-like shape.

Further, as the anode material capable of inserting and extracting the electrode reactant, for example, a metal oxide, a polymer compound and the like capable of inserting and extracting the electrode reactant are cited. As the metal oxide, for example, iron oxide, ruthenium oxide, molybdenum oxide or the like is cited. As the polymer compound, for example, polyacetylene, polyaniline, polypyrrole or the like is cited.

It is needless to say that as the anode material capable of inserting and extracting the electrode reactant, a material other than the foregoing may be used. Further, given two or more of the foregoing series of anode materials capable of inserting and extracting the electrode reactant may be used by mixture.

The anode active material preferably contains oxygen as an element, since thereby expansion and shrinkage of the anode active material layer 2 are prevented. In the case where the anode active material has silicon, at least part of oxygen is preferably bonded to part of silicon. The bonding state may be in the form of silicon monoxide, silicon dioxide, or in the form of other metastable state.

The oxygen content in the anode active material is preferably 3 atomic % or more and 40 atomic % or less, since thereby higher effects are obtained. Specifically, if the oxygen content is smaller than 3 atomic %, there is a possibility that expansion and shrinkage of the anode active material layer 2 are not sufficiently prevented. Meanwhile, if the oxygen content is larger than 40 atomic %, the resistance may be excessively increased. In the case where the anode is used together with an electrolytic solution in an electrochemical device, the anode active material does not include a coat formed by decomposition of the electrolytic solution and the like. That is, when the oxygen content in the anode active material is calculated, oxygen in the foregoing coat is not included in the calculation.

To make the anode active material contain oxygen, for example, oxygen gas may be continuously introduced into a chamber when the anode active material is deposited by vapor-phase deposition method. In particular, when a desired oxygen content is not obtained only by introducing the oxygen gas, a liquid (for example, moisture vapor or the like) may be introduced into the chamber as a supply source of oxygen.

Further, the anode active material preferably contains at least one metal element selected from the group consisting of iron, cobalt, nickel, chromium, titanium, and molybdenum as an element. Thereby, the binding characteristics of the anode active material are improved, expansion and shrinkage of the anode active material layer 2 are prevented, and resistance of the anode active material is lowered. The metal element content in the anode active material can be voluntarily set. However, in the case where the anode is used for a battery, an excessively high content of the metal element is not practical, since in such a case, the thickness of the anode active material layer 2 should be increased to obtain a desired battery capacity, and thereby separation of the anode active material layer 2 from the anode current collector 1 and break of the anode active material layer 2 may be easily caused.

To make the anode active material contain the foregoing metal element, for example, when the anode active material is deposited by evaporation method as vapor-phase deposition method, an evaporation source mixed with the metal element may be used, or multiple evaporation sources may be used.

Further, it is preferable that the anode active material has an oxygen-containing region in which the anode active material has oxygen in the thickness direction, and the oxygen content in the oxygen-containing region is larger than the oxygen content in the other regions. Thereby, expansion and shrinkage of the anode active material layer 2 are prevented. It is possible that the regions other than the oxygen-containing region contain oxygen or do not contain oxygen. It is needless to say that when the regions other than the oxygen-containing region also has oxygen, the oxygen content thereof is lower than the oxygen content in the oxygen-containing region.

In this case, to further suppress expansion and shrinkage of the anode active material layer 2, it is preferable that the regions other than the oxygen-containing region also have oxygen, and the anode active material includes a first oxygen-containing region (region having the lower oxygen content) and a second oxygen-containing region having the higher oxygen content than that of the first oxygen-containing region (region having the higher oxygen content). In this case, it is preferable that the second oxygen-containing region is sandwiched between the first oxygen-containing regions. It is more preferable that the first oxygen-containing region and the second oxygen-containing region are alternately and repeatedly layered. Thereby, higher effects are obtained. The oxygen content in the first oxygen-containing region is preferably small as much as possible. The oxygen content in the second oxygen-containing region is, for example, similar to the oxygen content in the case that the anode active material contains oxygen described above.

To make the anode active material include the first oxygen-containing region and the second oxygen-containing region, for example, oxygen gas may be by intermittently introduced into a chamber or the oxygen gas amount introduced into the chamber is changed when the anode active material is deposited by vapor-phase deposition method. It is needless to say that when a desired oxygen content is not able to be obtained only by introducing the oxygen gas, liquid (for example, moisture vapor or the like) may be introduced into the chamber.

It is possible that the oxygen content of the first oxygen-containing region is clearly different from the oxygen content of the second oxygen-containing region, or the oxygen content of the first oxygen-containing region is not clearly different from the oxygen content of the second oxygen-containing region. In particular, in the case where the introduction amount of the foregoing oxygen gas is continuously changed, the oxygen content may be continuously changed. In the case where the introduction amount of the oxygen gas is intermittently changed, the first oxygen-containing region and the second oxygen-containing region become so-called "layers." Meanwhile, in the case where the introduction amount of the oxygen gas is continuously changed, the first oxygen-containing region and the second oxygen-containing region become "lamellar state" rather than "layers." In the latter case, the oxygen content in the anode active material is distributed in a state of ups and downs. In this case, it is preferable that the oxygen content is incrementally or continuously changed between the first oxygen-containing region and the second oxygen-containing region. In the case where the oxygen content is changed drastically, the ion diffusion characteristics may be lowered, or the resistance may be increased.

In particular, the anode active material may be composed of a plurality of particles. In the case where the anode active material is formed by deposition method such as vapor-phase deposition method, the anode active material may have a single layer structure by being formed through a single deposition step, or may have a multilayer structure by being formed through a plurality of deposition steps. However, to prevent the anode current collector 1 from being damaged thermally when the anode active material is deposited by evaporation method or the like associated with high heat in the deposition step, the anode active material preferably has the multilayer structure. When the deposition step of the anode active material is divided into several steps (the anode active material is sequentially formed and deposited), time that the anode current collector 1 is exposed at high heat is shortened compared to a case that the anode active material is formed through a single deposition step.

Further, the anode active material is preferably linked to the anode current collector 1, since thereby the contact strength of the anode active material layer 2 to the anode current collector 1 is increased. To link the anode active material with the anode current collector 1, for example, the anode active material is deposited on the anode current collector 1 by vapor-phase deposition method or the like, the anode active material is grown from the surface of the anode current collector 1 in the thickness direction of the anode active material layer 2. In this case, it is preferable that the anode active material is deposited by vapor-phase deposition method, and the anode current collector 1 and the anode active material layer 2 are alloyed in at least the interface in between as described above.

In the case where the anode active material is composed of a plurality of particles, the anode active material layer 2 preferably contains a metal material not being alloyed with the electrode reactant together with the anode active material. Since each anode active material is bound to each other with the metal material in between, expansion and shrinkage of the anode active material layer 2 are prevented. In this case, in particular, when the anode active material is deposited by vapor-phase deposition method or the like, high binding characteristics are obtained as well. The metal material has a metal element not being alloyed with the electrode reactant. As the metal element, for example, at least one selected from the group consisting of iron, cobalt, nickel, zinc, and copper is cited. It is needless to say that the metal material may contain a metal element other than the foregoing metal elements. "Metal material" in the invention is a comprehensive term, and thus the metal material may be one of a simple substance, an alloy, and a compound, as long as the metal material contains a metal element not being alloyed with the electrode reactant.

Molar ratio M2/M1 between the number of moles M1 per unit area of the anode active material and the number of moles M2 per unit area of the metal material is not particularly limited, but preferably 1/15 or more and 7/1 or less. Thereby, expansion and shrinkage of the anode active material layer 2 are more prevented.

A detailed structural of the anode will be described by taking an example of a case in which the anode active material is composed of a plurality of particles and has a multilayer structure in the particle thereof.

Figure 2A:
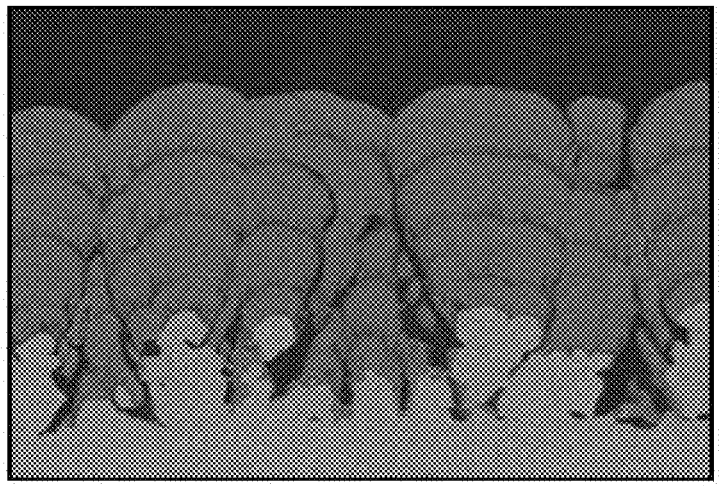
FIGS. 2A and 2B are an SEM photograph showing a cross sectional structure of the anode shown in FIG. 1 and a schematic drawing thereof.
Figure 2B:
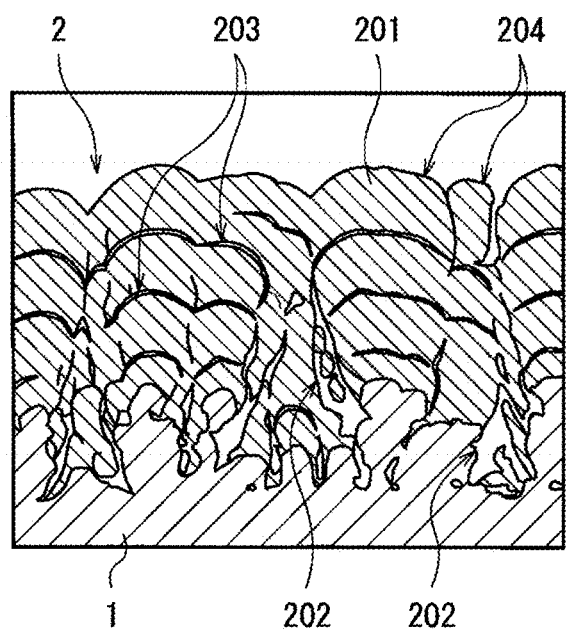

FIGS. 2A and 2B show an enlarged partial cross sectional structure of the anode current collector 1 and the anode active material layer 2 shown in FIG. 1. FIG. 2A is a scanning electron microscope (SEM) photograph (secondary electron image), and FIG. 2B is a schematic drawing of the SEM image shown in FIG. 2A.

In the case where the anode active material is composed of a plurality of particles (anode active material particles 201), a plurality of gaps and voids are generated in the anode active material layer 2. More specifically, on the roughened surface of the anode current collector 1, a plurality of projections (for example, fine particles formed by electrolytic treatment) exist. In this case, the anode active material is deposited several times on the surface of the anode current collector 1 by deposition method such as vapor-phase deposition method to form a laminated body of the anode active material, and thereby the anode active material particles 201 are incrementally grown in the thickness direction for every projection mentioned above. According to the density structure, the multilayer structure, and the surface structure of the plurality of anode active material particles 201, a plurality of gaps 202 and 203 and a plurality of voids 204 are generated.

The gap 202 is generated between each anode active material particle 201 adjacent to each other as the anode active material particle 201 is grown for every projection described above. The gap 203 is generated between each layer as the anode active material particles 201 have the multilayer structure. As fibrous minute projections (not shown) are generated on the surface of the anode active material particles 201, the void 204 is generated between the projections. The void 204 may be generated over the entire surface of the anode active material particles 201, or may be generated in part thereof. The foregoing fibrous minute projection is generated on the surface of the anode active material particles 201 every time when the anode active material particles 201 are formed. Thus, the void 204 is generated not only on the uppermost surface (exposed face) of the anode active material particles 201, but also between each layer.

Figure 3A:
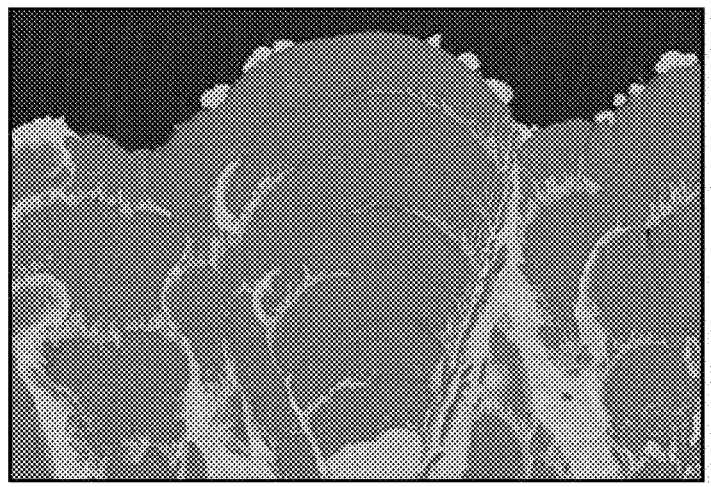
FIGS. 3A and 3B are an SEM photograph showing another cross sectional structure of the anode shown in FIG. 1 and a schematic drawing thereof.
Figure 3B:
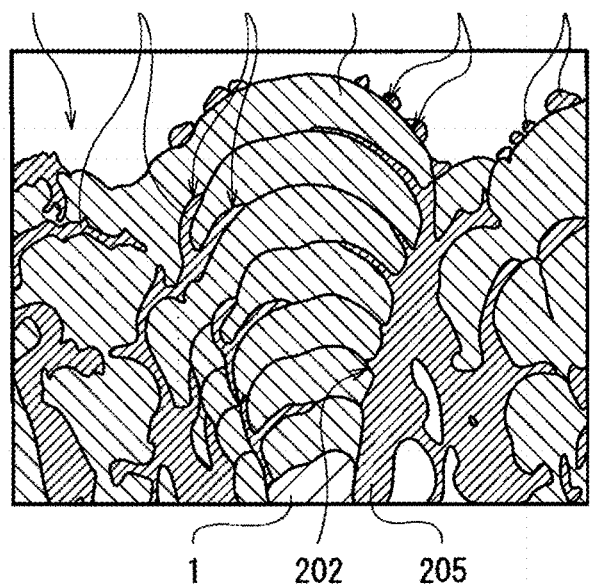

FIGS. 3A and 3B show another cross sectional structure of the anode current collector 1 and the anode active material layer 2, and show an SEM photograph and a schematic drawing corresponding to FIGS. 2A and 2B.

The anode active material layer 2 has a metal material 205 not being alloyed with the foregoing electrode reactant in the gaps 202 and 203 and the void 204. The plurality of anode active material particles 201 are bound with the metal material 205 in between, and thereby expansion and shrinkage of the anode active material layer 2 are prevented. In this case, at least one of the gaps 202 and 203 and the void 204 may have the metal material 205, and specially all of the gaps 202 and 203 and the void 204 preferably have the metal material 205, since thereby higher effects are obtained.

The metal material 205 intrudes into the gap 202 between adjacent anode active material particles 201. More specifically, in the case where the anode active material particles 201 are formed by vapor-phase deposition method or the like, as described above, the anode active material particles 201 are grown for every projection existing on the surface of the anode current collector 1, and thus the gap 202 is generated between the anode active material particles 201. The gap 202 causes lowering of the binding characteristics of the anode active material layer 2. Therefore, to improve the binding characteristics, the metal material 205 fills in the foregoing gap 202. In this case, it is enough that part of the gap 202 is filled therewith, but the larger filling amount is preferable, since thereby the binding characteristics of the anode active material layer 2 are further improved. The filling amount of the metal material 205 is preferably 20% or more, more preferably 40% or more, and much more preferably 80% or more.

The metal material 205 intrudes into the gap 203 in the anode active material particles 201. More specifically, in the case where the anode active material particles 201 have the multilayer structure, the gap 203 is generated between each layer. The gap 203 causes lowering of the binding characteristics of the anode active material layer 2 as the foregoing gap 202 does. Therefore, to improve the binding characteristics, the metal material 205 fills in the foregoing gap 203. In this case, it is enough that part of the gap is filled therewith, but the larger filling amount is preferable, since thereby the binding characteristics of the anode active material layer 2 are further improved.

Further, to prevent the fibrous minute projection (not shown) generated on the exposed face of the uppermost layer of the anode active material particles 201 from adversely affecting the performance of an electrochemical device, the projection is covered with the metal material 205. More specifically, in the case where the anode active material particles 201 are formed by vapor-phase deposition method or the like, the fibrous minute projections are generated on the surface thereof, and thus the void 204 is generated between the projections. The void 204 causes increase of the surface area of the anode active material, and accordingly the amount of an irreversible coat formed on the surface is also increased, possibly resulting in lowering of progression of the electrode reaction. Therefore, to avoid the lowering of progression of the electrode reaction, the foregoing void 204 is filled with the metal material 205. In this case, it is enough at minimum that part of the void 204 is filled therewith, but the larger filling amount is preferable, since thereby the lowering of progression of the electrode reaction is more prevented. A state that the metal material 205 is dotted on the exposed face (uppermost face) of the anode active material particles 221 means that the foregoing minute projection exists in the location where the metal material 205 is dotted. It is needless to say that the metal material 205 is not necessarily dotted on the surface of the anode active material particles 201, but may cover the entire surface thereof.

The metal material 205 that intrudes into the gap 203 has a function to fill in the void 204 in each layer. More specifically, in the case where the anode active material is deposited several times, the foregoing minute projection is generated on the surface thereof for every deposition. Therefore, the metal material 205 fills in not only the gap 203 in each layer, but also the void 204 in each layer.

The metal material 205 is formed by, for example, at least one of vapor-phase deposition method and liquid-phase deposition method. Specially, the metal material 205 is preferably formed by liquid-phase deposition method. Thereby, the metal material 205 easily intrudes into the gaps 202 and 203 and the void 204. As vapor-phase deposition method, for example, a method similar to the method of forming the anode active material is cited. Further, as liquid-phase deposition method, for example, plating method such as electrolytic plating method and electroless plating method are cited. Specially, electrolytic plating method is preferable, since thereby the metal material 205 more easily intrudes into the gaps 202 and 203 and the void 204.

In particular, the metal material 205 preferably has crystallinity, since thereby resistance of the entire anode is lowered, and the electrode reactant is easily inserted and extracted in the anode compared to a case that the metal material 205 does not have crystallinity (amorphous state). Further, in this case, the electrode reactant is uniformly inserted and extracted in initial operation of an electrochemical device (for example, in initial charge of a battery), and local stress is hardly generated in the anode, and accordingly a wrinkle is prevented from being generated.

In FIGS. 2A and 2B and 3A and 3B, the description has been given of a case that the anode active material has the multilayer structure, and the both gaps 202 and 203 exist in the anode active material layer 2, and thus the anode active material layer 2 has the metal material 205 in the gaps 202 and 203. Meanwhile, in the case where the anode active material has a single layer structure, and only the gap 202 exists in the anode active material layer 2, the anode active material layer 2 has the metal material 205 only in the gap 202. It is needless to say that in the both cases, since the void 204 exists in the anode active material layer 2, the anode active material layer 2 has the metal material 205 in the void 204.

As the electrical conductor, for example, a carbon material such as graphite, carbon black, acetylene black, and Ketjen black is cited. Such a carbon material may be used singly, or a plurality thereof may be used by mixture. The electrical conductor may be a metal material, a polymer or the like as long as the material has the electric conductivity.

As the binder, for example, a synthetic rubber such as styrene-butadiene rubber, fluorinated rubber, and ethylene propylene diene; or a polymer material such as polyvinylidene fluoride is cited. One thereof may be used singly, or a plurality thereof may be used by mixture.

The coat 3 contains at least one selected from the group consisting of fluorine resins having the structure shown in Chemical formula 1 or Chemical formula 2 (hereinafter simply referred to as "fluorine resin"). When the fluorine resin having the structure shown in Chemical formula 1 or Chemical formula 2 is provided on the anode active material layer 2 as a coat, the chemical stability of the anode is thereby improved. The coat 3 may be provided on the both faces of the anode current collector 1, or may be provided on only a single face. The structure of the fluorine resin can be identified by, for example, examining element bonding state in the coat 3 with the use of XPS.

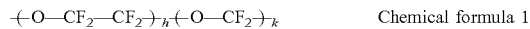   Chemical formula 1

(h and k represent a ratio, and h+k is 1.)

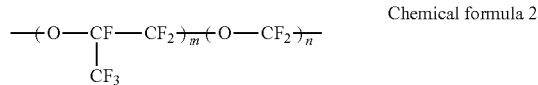   Chemical formula 2

(m and n represent a ratio, and m+n is 1.)

The ratio between h and k (h:k) shown in Chemical formula 1 can be voluntarily set. Specially, h>k is preferable, since thereby the chemical stability of the coat 3 is thereby further improved. The same is similarly applied to the ratio between m and n shown in Chemical formula 2.

The fluorine resin may have any structure as a whole as long as the fluorine resin has the structure shown in Chemical formula 1 or Chemical formula 2. That is, a terminal of the fluorine resin may be a perfluoro group such as a perfluoroalkyl group, or may be any of other various groups. When a terminal of the fluorine resin is the perfluoroalkyl group, the fluorine resin is so-called perfluoropolyether. As the perfluoroalkyl group, for example, a trifluoromethyl group (—CF₃) or the like is cited. However, a perfluoroalkyl group other than the trifluoromethyl group may be cited as well.

In particular, the fluorine resin preferably has the structure shown in Chemical formula 3 as a whole. In this case, the fluorine resin is fixed on the surface of the anode active material layer 2 (anode active material) through R1 and R2 at the terminals. Thus, contact strength of the coat 3 to the anode active material layer 2 is increased compared to a case that a terminal thereof is a perfluoro group. In this case, the anode active material preferably contains at least one selected from the group consisting of the simple substance, an alloy, and a compound of silicon, and the simple substance, an alloy, and a compound of tin. Thereby, the fluorine resin is firmly fixed on the surface of the anode active material, and thus contact strength of the coat 3 is more increased.

   Chemical formula 3

(X is a structure shown in Chemical formula 1 or Chemical formula 2. At least one of R1 and R2 is a group capable of being fixed on the surface of the anode active material layer.)

At least one of R1 and R2 shown in Chemical formula 3 may be any group, as long as the group can be fixed on the surface of the anode active material. "To be fixed" means a state that interaction (contact force) between the anode active material and the coat 3 is increased compared to a case that a terminal thereof is a perfluoroalkyl group. Such a state includes, for example, absorption, binding, adhesion or the like.

As at least one of R1 and R2, for example, a hydroxyl group (—OH), an ester group (—COOR), a silane group (—SiR₃), an alkoxysilane group (—Si(OR)₃), a phosphate group (—H₂PO₄), an amino group (—NR₂), an amide group (—CONR₂), a cyano group (—CC≡N), an isocyanate group (—N═C═O) or the like is cited, since thereby contact strength of the coat 3 is increased. R in the foregoing respective groups may be any group as long as it is a monovalent group such as a hydrogen group and an alkyl group.

More specifically, at least one of R1 and R2 has the structure shown in Chemical formula 4. When p in Chemical formula 4 is 0 or 1, an oxo group (—O—) is included in some cases, and is not included in some cases. The same is applied to R3 (q) and R4 (r). R7 and R8 in Chemical formula 11 may be identical or different. The same is applied to R9 to R18 shown in Chemical formulas 12 to 14 and Chemical formula 16.

   Chemical formula 4

(p, q, and r are 0 or 1. R3 is a divalent linked group shown in Chemical formula 5, R4 is a divalent linked group shown in Chemical formula 6 or Chemical formula 7, and R5 is a monovalent group shown in Chemical formula 8 to Chemical formula 17.)

   Chemical formula 5

(n is one of integer numbers 1 or higher.)

   Chemical formula 6

(n is one of integer numbers 1 or higher.)

   Chemical formula 7

   Chemical formula 8

(n is one of integer numbers 0 to 10.)

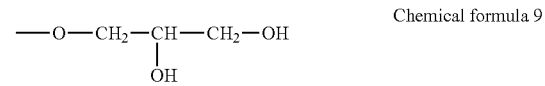   Chemical formula 9

   Chemical formula 10

(R6 is a hydrogen group, an alkyl group having a carbon number of 10 or less, or —CH$_2$—CN.)

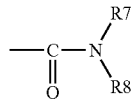

Chemical formula 11

(R7 and R8 are a hydrogen group or an alkyl group having a carbon number of 20 or less.)

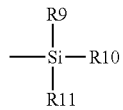

Chemical formula 12

(R9 to R11 are a hydrogen group, a halogen group, an alkyl group having a carbon number of 10 or less, an alkylene group having a carbon number of 10 or less, or an alkoxyl group having a carbon number of 10 or less.)

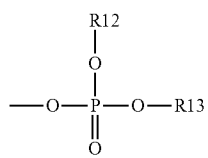

Chemical formula 13

(R12 and R13 are a hydrogen group, a hydroxyl group, a halogen group, or an alkyl group having a carbon number of 10 or less.)

Chemical formula 14

(R14 and R15 are a hydrogen group or an alkyl group having a carbon number of 10 or less.)

—N=C=O   Chemical formula 15

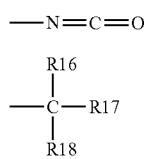

Chemical formula 16

(R16 to R18 are a hydrogen group or a halogen group.)

 —C≡N   Chemical formula 17

Specially, the structure shown in Chemical formula 8 or Chemical formula 9 or the structure shown in Chemical formula 12 (in the case that R9 to R11 are an alkoxyl group) is preferable, and the structure shown in Chemical formula 12 is more preferable, since thereby higher effects are obtained. The reason why the carbon number is limited in Chemical formula 8 and Chemical formula 10 to Chemical formula 14 is as follows. If the carbon number is excessively large, solubility into a solvent or the like becomes low. In this case, when the coat 3 is formed by liquid-phase deposition method such as dipping method, the formation amount (coating amount) is hardly controlled in a good reproducible fashion.

As a specific example of R1 and R2 shown in Chemical formula 3 and Chemical formula 4, for example, the group shown in Chemical formula 18(1) to Chemical formula 20(7) is cited.

Chemical formula 18

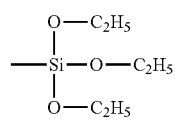 (1)

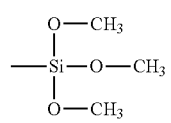 (2)

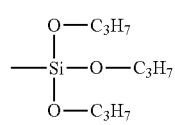 (3)

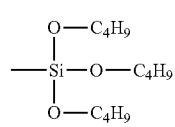 (4)

Chemical formula 19

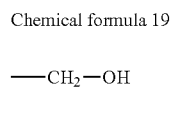 (1)

—CH$_2$—O—CH$_2$—CH$_2$—O—CH$_2$—CH$_2$—OH (2)

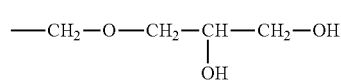 (3)

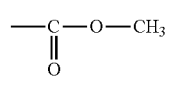 (4)

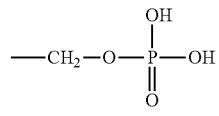 (5)

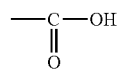 (6)

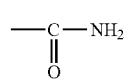 (7)

Chemical formula 20

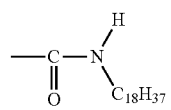 (1)

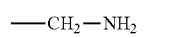 (2)

 (3)

-continued

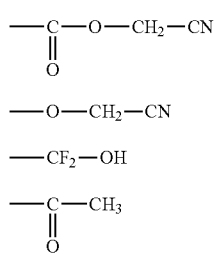

The relation between the structure shown in Chemical formula 4 (structure shown in Chemical formula 5 to Chemical formula 17) and the series of groups shown in Chemical formula 18(1) to Chemical formula 20(7) will be described as follows.

The groups shown in Chemical formulas 18(1) to 18(4) are groups in which p, q, and r are 0, and R5 is Chemical formula 12 (R9 to R11 are an alkoxyl group).

The group shown in Chemical formula 19(1) is a group in which p and q are 0, r is 1, R4 is Chemical formula 6 (n is 1), and R5 is Chemical formula 8 (n is 0). The group shown in Chemical formula 19(2) is a group in which p and q are 0, r is 1, R4 is Chemical formula 6 (n is 1), and R5 is Chemical formula 8 (n is 2). The group shown in Chemical formula 19(3) is a group in which p and q are 0, r is 1, R4 is Chemical formula 6 (n is 1), and R5 is Chemical formula 9. The group shown in Chemical formula 19(4) is a group in which p, q, and r are 0, and R5 is Chemical formula 10 (R6 is a methyl group). The group shown in Chemical formula 19(5) is a group in which p and q are 0, r is 1, R4 is Chemical formula 6 (n is 1), and R5 is Chemical formula 13 (R12 and R13 is a hydrogen group). The group shown in Chemical formula 19(6) is a group in which p and q are 0, r is 1, R4 is Chemical formula 7, and R5 is Chemical formula 8 (n is 0). The group shown in Chemical formula 19(7) is a group in which p, q, and r are 0, and R5 is Chemical formula 11 (R7 and R8 are a hydrogen group).

The group shown in Chemical formula 20(1) is a group in which p, q, and r are 0, and R5 is Chemical formula 11 (R7 is a hydrogen group, and R8 is an octadecyl group). The group shown in Chemical formula 20(2) is a group in which p and q are 0, r is 1, R4 is Chemical formula 6 (n is 1), and R5 is Chemical formula 14 (R14 and R15 are a hydrogen group). The group shown in Chemical formula 20(3) is a group in which p and q are 0, r is 1, R4 is Chemical formula 6 (n is 1), and R5 is Chemical formula 15. The group shown in Chemical formula 20(4) is a group in which p, q, r are 0, and R5 is Chemical formula 10 (R6 is —CH$_2$—CN). The group shown in Chemical formula 20(5) is a group in which p and r are 1, q is 0, R4 is Chemical formula 6 (n is 1), and R5 is Chemical formula 17. The group shown in Chemical formula 20(6) is a group in which p and r are 0, q is 1, R3 is Chemical formula 5 (n is 1), and R5 is Chemical formula 8 (n is 0). The group shown in Chemical formula 20(7) is a group in which p and q are 0, r is 1, R4 is Chemical formula 6 (n is 1), and R5 is Chemical formula 16 (R16 to R18 are a hydrogen group).

Specially, a fluorine resin having the structure shown in Chemical formulas 18(1) to 18(4) or Chemical formulas 19(1) to 19(3) is preferable, and a fluorine resin having the structure shown in Chemical formulas 18(1) to 18(4) is more preferable, since the electrode reactant is hardly consumed due to existence of the coat 3 in electrode reaction and thus electrode reaction efficiency is improved.

The coat 3 can be formed by, for example, dipping method, coating method, spray method or the like. Specifically, liquid-phase deposition method represented by dipping method is preferable, since the coat 3 having a sufficient film thickness can be easily formed. However, the coat 3 may be formed by other method.

In particular, when the coat 3 containing the fluorine resin is provided on the anode active material layer 2, the surface of the coat 3 preferably has a fluoride of the electrode reactant (hereinafter simply referred to as "fluoride"). The fluoride prevents expansion and shrinkage of the anode active material layer 2 and keeps the surface area of the anode active material small. Thus, the chemical stability of the anode is further improved. The fluoride is formed by reaction between the electrode reactant and fluorine in the fluorine resin in electrode reaction (for example, in charge and discharge in a battery). For example, in the case where the anode is used for a battery containing lithium as an electrode reactant, the fluoride includes lithium fluoride. The fluoride may be formed on the surface of the coat 3 in a state of a membrane or in a state of particles.

In the case where the fluoride is formed on the surface of the coat 3, there is a tendency that formation of the fluoride is almost completed in one electrode reaction (first electrode reaction), and the fluoride is almost never formed through subsequent electrode reactions (on and after the second electrode reaction). Accordingly, if the fluoride is generated on the surface of the coat 3, it is possible to determine whether or not electrode reaction is initiated in the anode without relation to the history of the anode (the number of electrode reactions repeated in the anode until then). In other words, when the fluoride is generated on the surface of the coat 3, it means that electrode reaction has been already generated in the anode. The foregoing "one electrode reaction" means, in the case of charge and discharge when the anode is used for a battery, a case that the battery is charged and discharged in a general (practical) conditions, but does not mean a case that the battery is charged and discharged under special conditions such as overcharge.

The anode is formed, for example, by the following procedure.

First, the anode current collector 1 made of an electrolytic copper foil or the like is prepared. After that, the anode active material is deposited on the surface of the anode current collector 1 by vapor-phase deposition method or the like to form the anode active material layer 2. When the anode active material is deposited by vapor-phase deposition method, it is possible to form a single layer structure by 1 deposition step, or a multilayer structure by a plurality of deposition steps. In particular, in the case where the anode active material is formed into the multilayer structure, it is possible that the anode active material is deposited a plurality of times while the anode current collector 1 is relatively reciprocated to an evaporation source, or it is possible that the anode active material is deposited a plurality of times while a shutter is repeatedly opened and closed keeping the anode current collector 1 fixed to the evaporation source. Finally, a solution in which a fluorine resin is dissolved in a solvent or the like is prepared. After that, the anode current collector 1 on which the anode active material layer 2 is formed is dipped into the solution, taken out and dried to form the coat 3. Thereby, the anode is completed.

According to the anode, the coat 3 provided on the anode active material layer 2 contains at least one selected from the fluorine resins having the structure shown in Chemical formula 1 or Chemical formula 2. Thus, compared to a case that the coat 3 is not provided, the chemical stability of the anode is improved. Such an action is particularly significant when the anode active material contains highly active silicon or tin. As a result, the anode contributes to improvement of the cycle characteristics of an electrochemical device using the anode.

In particular, when the fluorine resin has the structure shown in Chemical formula 3, more particularly, when the fluorine resin has the structure that the terminal of the fluorine resin (R1, R2) is a hydroxyl group or the like, or when the fluorine resin has the structure shown in Chemical formula 4, the contact strength of the coat 3 to the anode active material layer 2 is increased, and thus higher effects are obtained, compared to a case that a terminal is a perfluoro alkyl group.

Further, when the fluoride of the electrode reactant exists on the surface of the coat 3, the chemical stability of the anode is further improved, and thus higher effects are obtained.

Further, when the anode active material has oxygen and the oxygen content in the anode active material is 3 atomic % or more and 40 atomic % or less, or when the anode active material contains at least one metal element selected from the group consisting of iron, cobalt, nickel, titanium, chromium, and molybdenum, or when the anode active material has the oxygen-containing region (region in which oxygen exists and the oxygen content thereof is higher than that of the other regions) in the thickness direction, higher effects are obtained.

Further, when the ten points average height of roughness profile Rz of the surface of the anode current collector 1 is 1.5 μm or more and 6.5 μm or less, the contact characteristics between the anode current collector 1 and the anode active material layer 2 are improved, and therefore higher effects are obtained.

In addition, when the anode active material layer 2 has the metal material not being alloyed with the electrode reactant together with the anode active material, the binding characteristics of the anode active material are improved and expansion and shrinkage of the anode active material layer 2 are prevented, and thus higher effects are obtained. In this case, when the metal material is formed by liquid-phase deposition method, higher effects are obtained. Further, when the molar ratio M2/M1 between the anode active material and the metal material is 1/15 or more and 7/1 or less, higher effects are obtained.

Next, a description will be hereinafter given of a usage example of the foregoing anode. As an example of the electrochemical devices, batteries are herein taken. The anode is used for the batteries as follows.

The battery herein described, for example, includes a cathode and the anode opposed to each other with a separator in between, and an electrolytic solution. The battery is a lithium-ion secondary battery in which the anode capacity is expressed based on insertion and extraction of lithium as an electrode reactant. The cathode has a cathode active material layer on a cathode current collector. The electrolytic solution contains a solvent and an electrolyte salt.

In the secondary battery, at least one element out of the cathode, the anode, the separator, and the electrolytic solution contains at least one selected from the fluorine resins having the structure shown in Chemical formula 1 or Chemical formula 2. Accordingly, the chemical stability of the element containing the fluorine resin is improved, and thus decomposition reaction of the electrolytic solution is prevented. In the case where the cathode and the anode contains the fluorine resin, as already described for the foregoing anode, a coat containing the fluorine resin is provided on the cathode active material layer or the anode active material layer. In the case where the electrolytic solution contains the fluorine resin, the fluorine resin is dispersed in the solvent. In this case, the entire fluorine resin may be dissolved in the solvent, or only part thereof may be dissolved therein. In the case where the separator has the fluorine resin, a coat containing the fluorine resin is provided on a single face or the both faces thereof.

The element containing the fluorine resin may be only one of the cathode, the anode, the separator, and the electrolytic solution. However, it is preferable that two of the cathode, the anode, the separator, and the electrolytic solution contain the fluorine resin, and it is more preferable that all thereof contain the fluorine resin, since thereby decomposition reaction of the electrolytic solution is more prevented. Specially, when limited to a combination composed of two elements containing the fluorine resin, the combination of the anode and the separator is preferable, since thereby higher effects are obtained.

In the case where only one of the cathode, the anode, the separator, and the electrolytic solution contains the fluorine resin, it is preferable that the cathode, the anode, or the separator contains the fluorine resin, and it is more preferable that the anode contains the fluorine resin, since thereby the decomposition reaction is more prevented.

The secondary battery type (battery structure) is not particularly limited. A description will be hereinafter given of a structure of the secondary battery in detail for a case that the anode contains the fluorine resin taking a square secondary battery, a cylindrical secondary battery, and a laminated film secondary battery as an example of a battery structure.

First Battery

Figure 4:
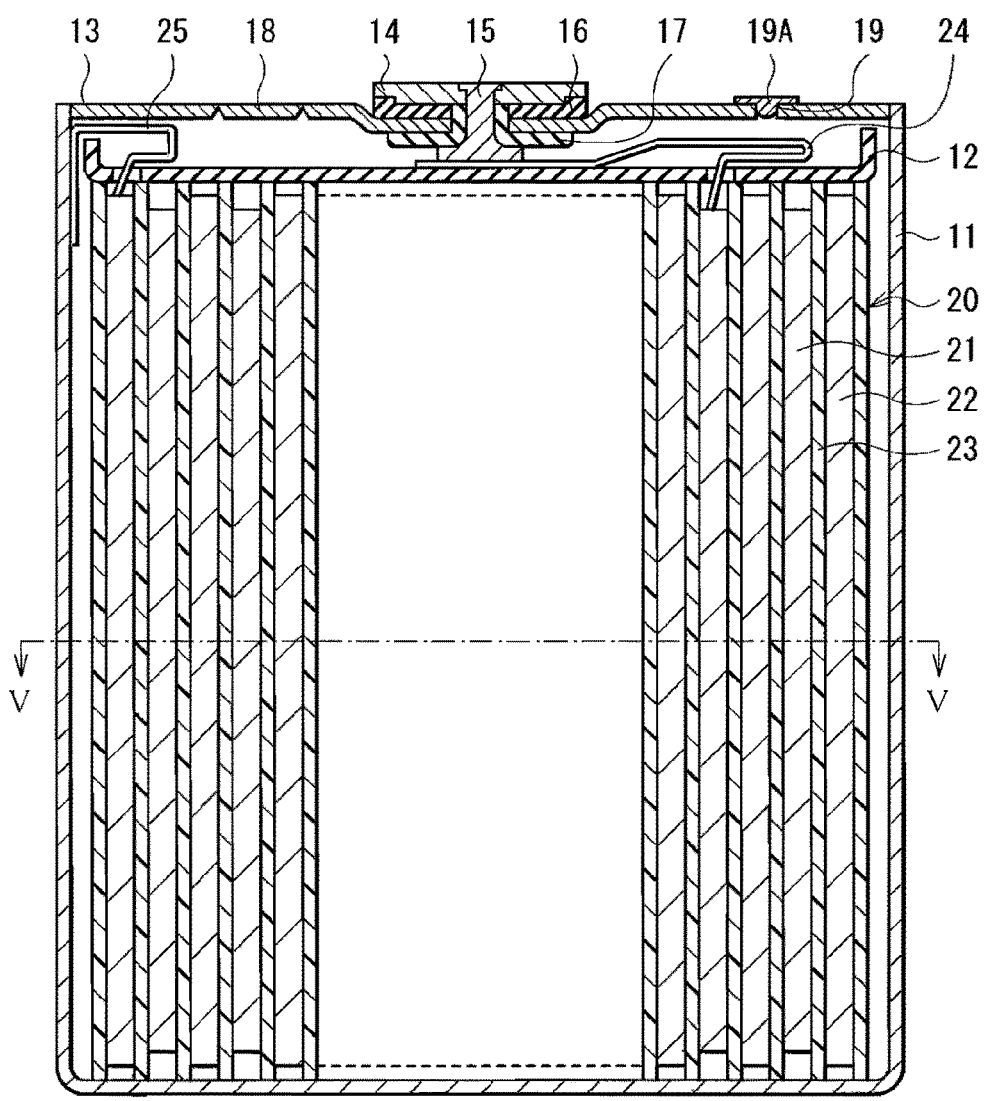
FIG. 4 is a cross section showing a structure of a first battery including the anode according to the embodiment of the invention.
Figure 5:
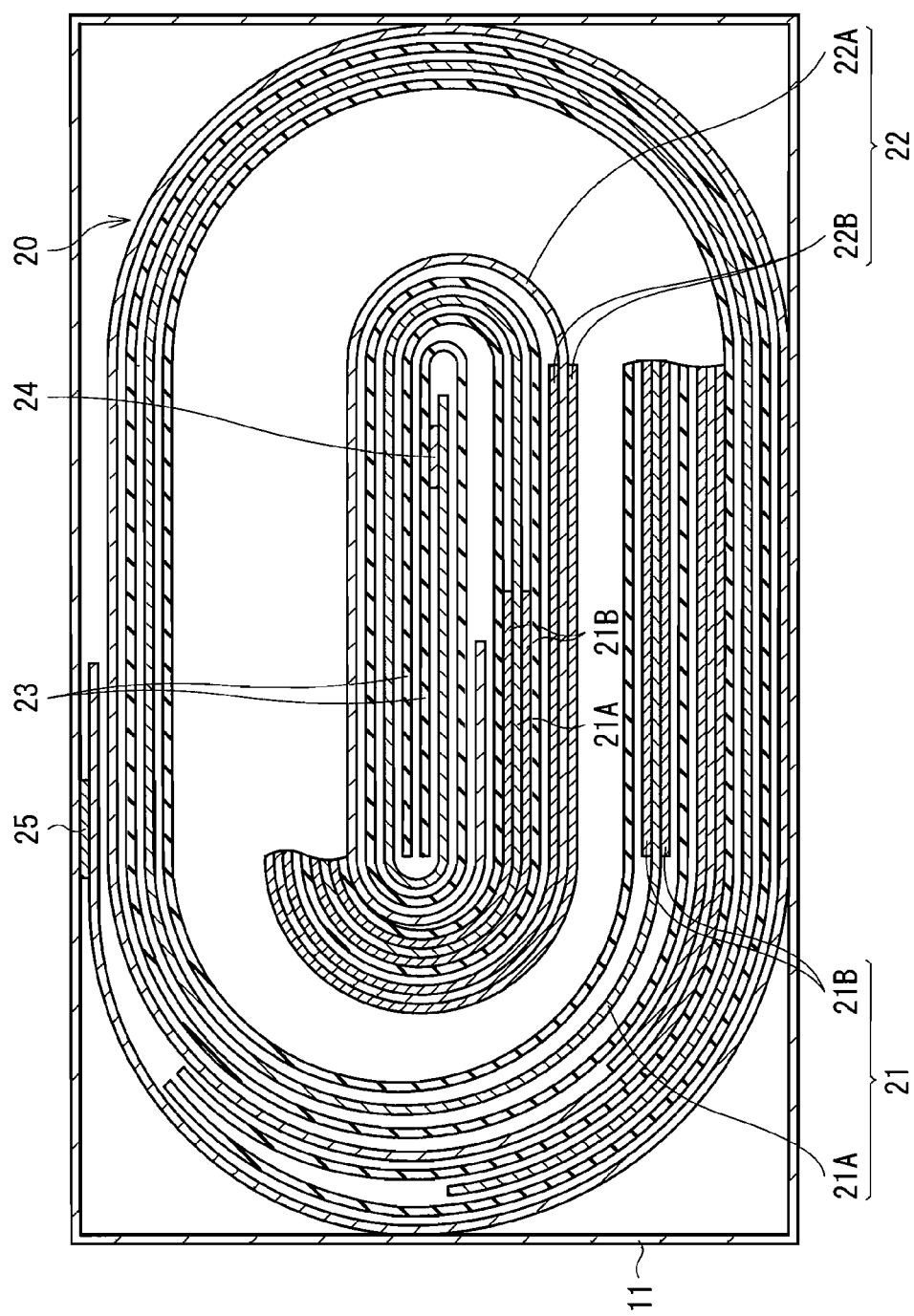
FIG. 5 is a cross section taken along line V-V of the first battery shown in FIG. 4.

FIG. 4 and FIG. 5 show cross sectional structures of a first battery. FIG. 5 shows a cross section taken along line V-V shown in FIG. 4.

The battery is, as described above, a lithium ion secondary battery in which the capacity of an anode 22 is expressed based on insertion and extraction of lithium as an electrode reactant. In the secondary battery, a battery element 20 having a flat spirally wound structure is mainly contained in a battery can 11. The battery can 11 is, for example, a square package member. As shown in FIG. 5, the square package member has a shape with the cross section in the longitudinal direction of a rectangle or an approximate rectangle (including curved lines in part). The square package member structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 5 shows a case that the battery can 11 has a rectangular cross sectional shape. The battery structure including the battery can 11 is called square structure.

The battery can 11 is made of, for example, a metal material containing iron, aluminum (Al), or an alloy thereof. The battery can 11 may have a function as an anode terminal as well. In this case, to prevent the secondary battery from being swollen by using the rigidity (hardly deformable characteristics) of the battery can 11 when charged and discharged, rigid iron is more preferable than aluminum. In the case where the battery can 11 is made of iron, the iron may be plated by nickel (Ni) or the like, for example.

The battery can 11 has a hollow structure in which one end of the battery can 11 is closed and the other end of the battery can 11 is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and also has a function as an anode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. When the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless corundum.

The battery element 20 is formed by layering a cathode 21 and the anode 22 with a separator 23 in between and then spirally winding the resultant laminated body. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

Figure 6:
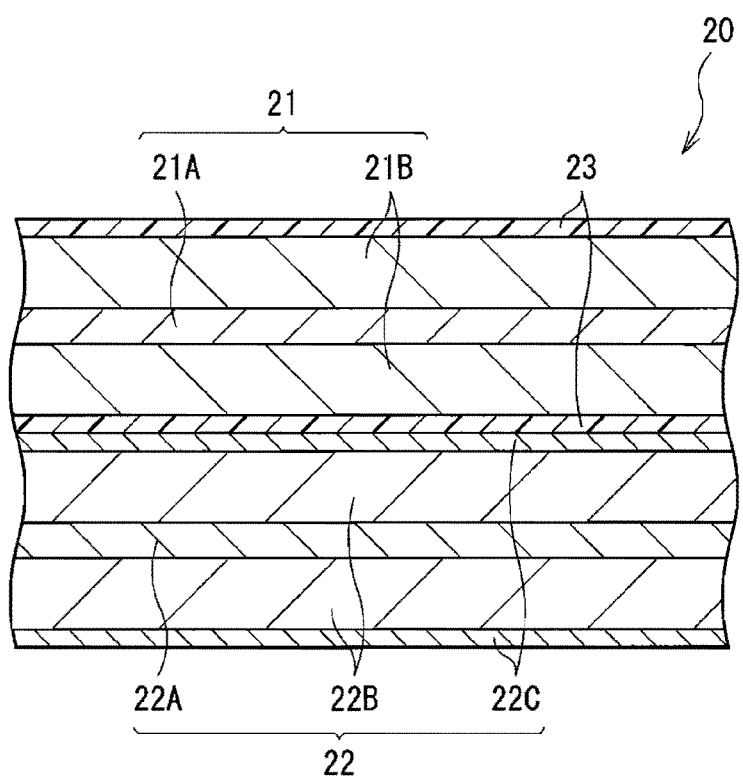
FIG. 6 is a cross section showing an enlarged part of the battery element shown in FIG. 5.

FIG. 6 shows an enlarged part of the spirally wound electrode body 20 shown in FIG. 5. In the cathode 21, for example, a cathode active material layer 21B is provided on the both faces of a strip-shaped cathode current collector 21A having a pair of faces. The cathode active material layer 21B may be provided on the both faces of the cathode current collector 21A or on only a single face of the cathode current collector 21A. The cathode current collector 21A is, for example, made of a metal material such as aluminum, nickel, and stainless. The cathode active material layer 21B contains, as a cathode active material, one or more cathode materials capable of inserting and extracting lithium. The cathode active material layer 21B may contain other material such as a binder and an electrical conductor according to needs. Details of the binder and the electrical conductor are similar to those of the case described for the foregoing anode.

As the cathode material capable of inserting and extracting lithium, for example, lithium-containing compounds are preferable, since thereby a high energy density is obtained. As the lithium-containing compound, for example, a complex oxide containing lithium and a transition metal element or a phosphate compound containing lithium and a transition metal element is cited. In particular, a compound containing at least one selected from the group consisting of cobalt, nickel, manganese, and iron as a transition metal element is preferable, since thereby a higher voltage is obtained. The chemical formula thereof is expressed as, for example, $Li_xM1O_2$ or $Li_yM2PO_4$. In the formula, M1 and M2 represent one or more transition metal elements. Values of x and y vary according to the charge and discharge state of the battery, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}CO_zO_2$ (z<1)), a lithium nickel cobalt manganese complex oxide ($Li_xNi_{(1-v-w)}CO_vMn_wO_2$ (v+w<1)), lithium manganese complex oxide having a spinel structure ($LiMn_2O_4$) or the like is cited. Specially, a complex oxide containing cobalt is preferable, since thereby a high capacity is obtained and superior cycle characteristics are obtained. As the phosphate compound containing lithium and a transition metal element, for example, lithium iron phosphate compound ($LiFePO_4$), a lithium iron manganese phosphate compound ($LiFe_{1-u}Mn_uPO_4$ (u<1)) or the like is cited.

In addition, as the foregoing cathode material, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are cited.

The anode 22 has a structure similar to that of the anode described above. For example, in the anode 22, an anode active material layer 22B and a coat 22C are provided on the both faces of a strip-shaped anode current collector 22A having a pair of faces. The structures of the anode current collector 22A, the anode active material layer 22B, and the coat 22C are respectively similar to the structures of the anode current collector 1, the anode active material layer 2, and the coat 3 in the anode described above. In the anode 22, the charge capacity of the anode active material capable of inserting and extracting lithium is preferably larger than the charge capacity of the cathode 21.

The separator 23 separates the cathode 21 from the anode 22, and passes ions as an electrode reactant while preventing current short circuit due to contact of the both electrodes. The separator 23 is made of, for example, a porous film made of a synthetic resin such as polytetrafluoroethylene, polypropylene, and polyethylene, a ceramic porous film or the like. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester carbonate solvent such as ethylene carbonate, propylene carbonate, butylene carbonate, dimethyl carbonate, diethyl carbonate, ethyl methyl carbonate, and methyl propyl carbonate. Thereby, superior capacity characteristics, superior cycle characteristics, and superior storage characteristics are obtained. Specially, a mixture of a high viscosity solvent such as ethylene carbonate and propylene carbonate and a low viscosity solvent such as dimethyl carbonate, ethyl methyl carbonate, and diethyl carbonate is preferable. Thereby, the dissociation property of the electrolyte salt and the ion mobility are improved, and thus higher effects are obtained.

The solvent preferably contains at least one of a chain ester carbonate having halogen as an element shown in Chemical formula 21 and a cyclic ester carbonate having halogen as an element shown in Chemical formula 22. Thereby, a stable protective film (coat) is formed on the surface of the anode 22 and decomposition reaction of the electrolytic solution is prevented, and thus the cycle characteristics are improved.

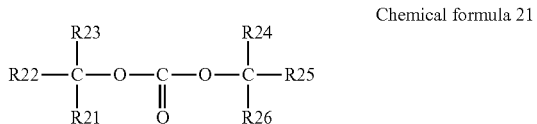

Chemical formula 21

(R21 to R26 are a hydrogen group, a halogen group, an alkyl group, or an alkyl halide group. At least one of R21 to R26 is the halogen group or the alkyl halide group.)

Chemical formula 22

(R31 to R34 are a hydrogen group, a halogen group, an alkyl group, or an alkyl halide group. At least one of R31 to R34 is the halogen group or the alkyl halide group.)

R21 to R26 in Chemical formula 21 may be identical or different. The same is applied to R31 to R34 in Chemical formula 22. "Alkyl halide group" described in R21 to R24 and R31 to R34 is a group obtained by substituting at least partial hydrogen of the alkyl group with halogen. The halogen type is not particularly limited, but for example, at least one selected from the group consisting of fluorine, chlorine, and bromine is cited. Specially, fluorine is preferable, since thereby higher effects are obtained. It is needless to say that other halogen may be used.

The number of halogen is more preferably two than one, and further may be three or more, since thereby an ability to form the protective film is improved and more rigid and stable protective film is formed. Accordingly, decomposition reaction of the electrolytic solution is more prevented.

As the chain ester carbonate having halogen shown in Chemical formula 21, for example, fluoromethyl methyl carbonate, bis (fluoromethyl) carbonate, difluoromethyl methyl carbonate or the like is cited. One thereof may be used singly, or a plurality thereof may be used by mixture.

As the cyclic ester carbonate having halogen shown in Chemical formula 22, for example, the compounds shown in Chemical formulas 23-1 to 24-9 are cited. That is, 4-fluoro-1,3-dioxolane-2-one of Chemical formula 23(1), 4-chloro-1,3-dioxolane-2-one of Chemical formula 23(2), 4,5-difluoro-1,3-dioxolane-2-one of Chemical formula 23(3), tetrafluoro-1,3-dioxolane-2-one of Chemical formula 23(4), 4-fluoro-5-chloro-1,3-dioxolane-2-one of Chemical formula 23(5), 4,5-dichloro-1,3-dioxolane-2-one of Chemical formula 23(6), tetrachloro-1,3-dioxolane 2-one of Chemical formula 23(7), 4,5-bis trifluoro methyl-1,3-dioxolane 2-one of Chemical formula 23(8), 4-trifluoro methyl-1,3-dioxo-lane-2-one of Chemical formula 23(9), 4,5-difluoro-4,5-dimethyl-1,3-dioxolane-2-one of Chemical formula 23(1)0, 4-methyl-5,5-difluoro-1,3-dioxolane-2-one of Chemical formula 23(1)1, 4-ethyl-5,5-difluoro-1,3-dioxolane-2-one of Chemical formula 23(1)2 and the like are cited. Further, 4-trifluoromethyl-5-fluoro-1,3-dioxolane-2-one of Chemical formula 24(1), 4-trifluoromethyl-5-methyl-1,3-dioxolane-2-one of Chemical formula 24(2), 4-fluoro-4,5-dimethyl-1,3-dioxolane-2-one of Chemical formula 24(3), 4,4-difluoro-5-(1,1-difluoroethyl)-1,3-dioxolane-2-one of Chemical formula 24(4), 4,5-dichloro-4,5-dimethyl-1,3-dioxolane-2-one of Chemical formula 24(5), 4-ethyl-5-fluoro-1,3-dioxolane-2-one of Chemical formula 24(6), 4-ethyl-4,5-difluoro-1,3-dioxolane-2-one of Chemical formula 24(7), 4-ethyl-4,5,5-trifluoro-1,3-dioxolane-2-one of Chemical formula 24(8), 4-fluoro-4-methyl-1,3-dioxolane-2-one of Chemical formula 24(9) and the like are cited. One thereof may be used singly, or a plurality thereof may be used by mixture.

Chemical formula 23

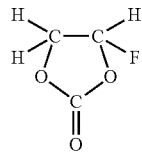

(1)

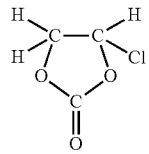

(2)

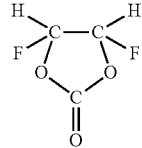

(3)

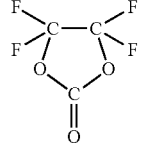

(4)

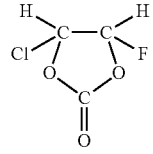

(5)

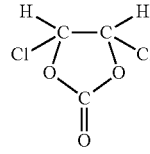

(6)

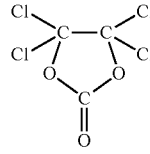

(7)

-continued

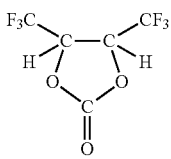 (8)

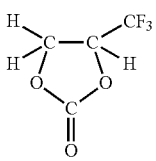 (9)

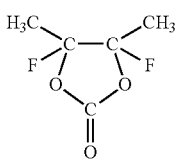 (10)

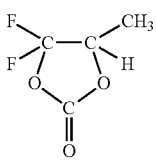 (11)

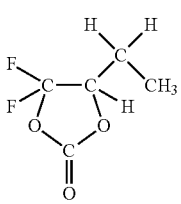 (12)

Chemical formula 24

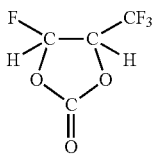 (1)

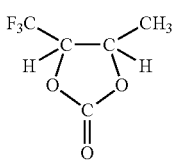 (2)

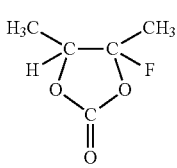 (3)

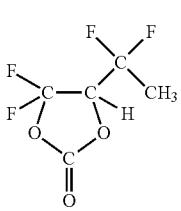 (4)

-continued (5)

(6)

(7)

(8)

(9)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effects.

Further, the solvent preferably contains a cyclic ester carbonate having an unsaturated bond, since thereby the cycle characteristics can be improved. As the cyclic ester carbonate having an unsaturated bond, for example, vinylene carbonate, vinyl ethylene carbonate or the like is cited. A plurality thereof may be used by mixture.

Further, the solvent preferably contains sultone (cyclic ester sulfonate), since thereby the cycle characteristics are improved and swollenness of the secondary battery is prevented. As the sultone, for example, propane sultone, propene sultone or the like is cited. A plurality thereof may be used by mixture.

In addition, the solvent preferably contains an acid anhydride, since thereby the cycle characteristics are improved. As the acid anhydride, for example, succinic anhydride, glutaric anhydride, maleic anhydride, sulfobenzoic acid anhydride, sulfo propionic acid anhydride, sulfo butyric acid anhydride, ethane disulfonic acid anhydride, propane disulfonic acid anhydride, benzene disulfonic acid anhydride and the like are cited. A plurality thereof may be used by mixture. Specially, sulfo benzoic acid anhydride or sulfo propionic acid anhydride is preferable, since thereby sufficient effects are obtained. The content of the acid anhydride in the solvent is, for example, 0.5 wt % or more and 3 wt % or less.

The electrolyte salt contains, for example, one or more light metal salts such as a lithium salt. As the lithium salt, for example, lithium hexafluorophosphate, lithium tetrafluoroborate, lithium perchlorate, lithium hexafluoroarsenate or the like is cited, since thereby superior capacity characteristics, superior cycle characteristics, and superior storage characteristics are obtained. Specially, lithium hexafluorophosphate is preferable, since the internal resistance is lowered, and thus higher effects are obtained.

The electrolyte salt preferably contains at least one selected from the group consisting of the compounds shown in Chemical formula 25 to Chemical formula 27. Thereby, in the case where such a compound is used together with the foregoing lithium hexafluorophosphate or the like, higher effects are obtained. R41 and R43 in Chemical formula 25 may be identical or different. The same is applied to R51 to R53 in Chemical formula 26 and R61 and R62 in Chemical formula 27.

Chemical formula 25

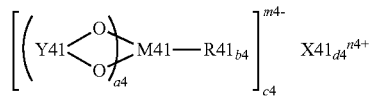

(X41 is a Group 1A element or a Group 2A element in the short period periodic table or aluminum. M41 is a transition metal, a Group 3B element, a Group 4B element, or a Group 5B element in the short period periodic table. R41 is a halogen group. Y41 is —OC—R42-CO—, —OC—CR43$_2$-, or —OC—CO—. R42 is an alkylene group, an alkylene halide group, an arylene group, or an arylene halide group. R43 is an alkyl group, an alkyl halide group, an aryl group, or an aryl halide group. a4 is one of integer numbers 1 to 4. b4 is one of integer numbers 0, 2, and 4. c4, d4, m4, and n4 is one of integer numbers 1 to 3.)

Chemical formula 26

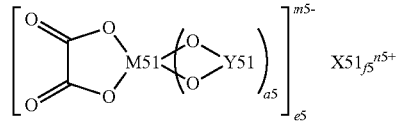

(X51 is a Group 1A element or a Group 2A element in the short period periodic table. M51 is a transition metal element, a Group 3B element, a Group 4B element, or a Group 5B element in the short period periodic table. Y51 is —OC—(CR51$_2$)$_{b5}$-CO—, —R53$_2$C—(CR52$_2$)$_{c5}$-CO—, —R53$_2$C—(CR52$_2$)$_{c5}$-CR53$_2$-, —R53$_2$C—(CR52$_2$)$_{c5}$-SO$_2$—, —O$_2$S—(CR52$_2$)$_{d5}$-SO$_2$—, or —OC—(CR52$_2$)$_{d5}$-SO$_2$—. R51 and R53 are a hydrogen group, an alkyl group, a halogen group, or an alkyl halide group. At least one of R51/R53 is respectively the halogen group or the alkyl halide group. R52 is a hydrogen group, an alkyl group, a halogen group, or an alkyl halide group. a5, e5, and n5 are an integer number of 1 or 2. b5 and d5 are one of integer numbers 1 to 4. c5 is one of integer numbers 0 to 4. f5 and m5 are one of integer numbers 1 to 3.)

Chemical formula 27

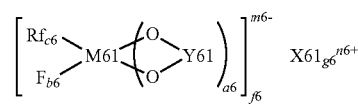

(X61 is a Group 1A element or a Group 2A element in the short period periodic table. M61 is a transition metal element, a Group 3B element, a Group 4B element, or a Group 5B element in the short period periodic table. Rf is a fluorinated alkyl group with the carbon number in the range from 1 to 10 or a fluorinated aryl group with the carbon number in the range from 1 to 10. Y61 is —OC—(CR61$_2$)$_{d6}$-CO—, —R62$_2$C—(CR61$_2$)$_{d6}$-CO—, —R62$_2$C—(CR61$_2$)$_{d6}$-CR62$_2$-, —R62$_2$C—(CR61$_2$)$_{d6}$-SO$_2$—, —O$_2$S—(CR61$_2$)$_{e6}$-SO$_2$—, or —OC—(CR61$_2$)$_{e6}$-SO$_2$—. R61 is a hydrogen group, an alkyl group, a halogen group, or an alkyl halide group. R62 is a hydrogen group, an alkyl group, a halogen group, or an alkyl halide group, and at least one thereof is the halogen group or the alkyl halide group. a6, f6, and n6 are an integer number of 1 or 2. b6, c6, and e6 are one of integer numbers 1 to 4. d6 is one of integer numbers 0 to 4. g6 and m6 are one of integer numbers 1 to 3.)

As a compound shown in Chemical formula 25, for example, the compounds shown in Chemical formulas 28-1 to 28-6 are cited. As a compound shown in Chemical formula 26, for example, the compounds shown in Chemical formulas 29-1 to 29-8 are cited. As a compound shown in Chemical formula 27, for example, the compound shown in Chemical formula 30 or the like is cited. It is needless to say that the compound is not limited to the compounds shown in Chemical formula 28(1) to Chemical formula 30, and the compound may be other compound as long as such a compound has the structure shown in Chemical formula 25 to Chemical formula 27.

Chemical formula 28

(1)

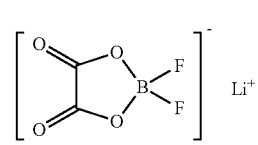

(2)

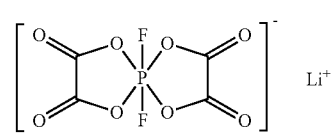

(3)

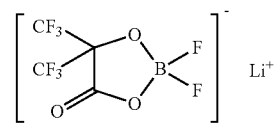

(4)

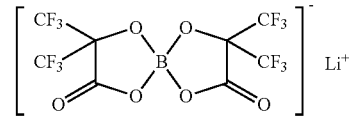

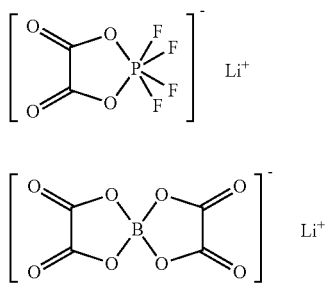

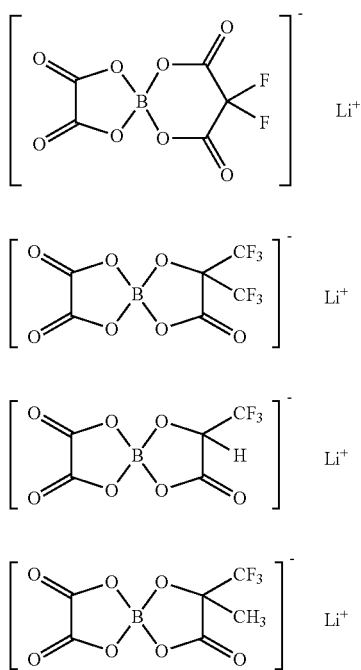

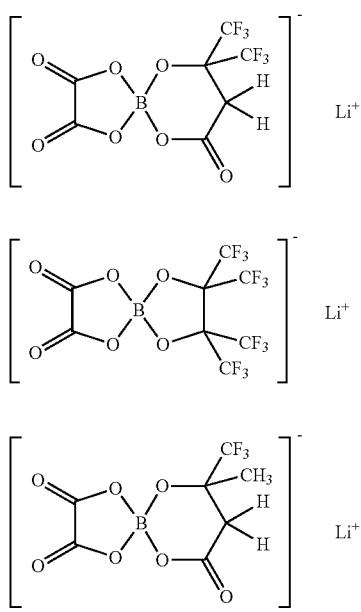

Chemical formula 29

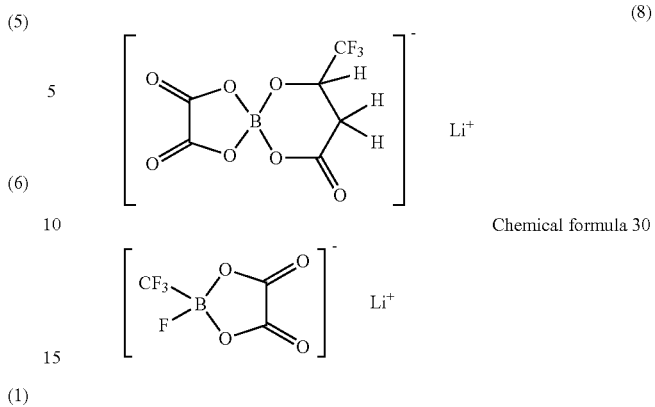

Chemical formula 30

The electrolyte salt may contain at least one selected from the group consisting of the compounds shown in Chemical formula 31 to Chemical formula 33. Thereby, in the case where such a compound is used together with the foregoing lithium hexafluorophosphate, higher effects are obtained. m and n in Chemical formula 31 may be identical or different. The same is applied to p, q, and r in Chemical formula 33.

$$\text{LiN}(C_mF_{2m+1}SO_2)(C_nF_{2n+1}SO_2) \qquad \text{Chemical formula 31}$$

(m and n are an integer number of 1 or more.)

Chemical formula 32

$$\begin{bmatrix} R71 \begin{array}{c} O\ \ \ O \\ \diagdown S \diagup \\ \ \ \ \ \ \ \ \ N^- \\ \diagup S \diagdown \\ O\ \ \ O \end{array} \end{bmatrix} \text{Li}^+$$

(R71 is a straight chain/branched perfluoro alkylene group with the carbon number in the range from 2 to 4.)

$$\text{LiC}(C_pF_{2p+1}SO_2)(C_qF_{2q+1}SO_2)(C_rF_{2r+1}SO_2) \qquad \text{Chemical formula 33}$$

(p, q, and r are an integer number of 1 or more.)

As the chain compound shown in Chemical formula 31, for example, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl) (heptafluoropropanesulfonyl)imide (LiN(CF$_3$SO$_2$)(C$_3$F$_7$SO$_2$)), lithium (trifluoromethanesulfonyl) (nonafluorobutanesulfonyl)imide (LiN(CF$_3$SO$_2$)(C$_4$F$_9$SO$_2$)) or the like is cited. One thereof may be used singly, or a plurality thereof may be used by mixture.

As the cyclic compound shown in Chemical formula 32, for example, the compounds shown in Chemical formulas 34-1 to 34-4 are cited. That is, lithium 1,2-perfluoroethanedisulfonylimide shown in Chemical formula 34-1, lithium 1,3-perfluoropropanedisulfonylimide shown in Chemical formula 34-2, lithium 1,3-perfluorobutanedisulfonylimide shown in Chemical formula 34-3, lithium 1,4-perfluorobutanedisulfonylimide shown in Chemical formula 34-4 or the like is cited. One thereof may be used singly, or a plurality thereof may be used by mixture. Specially, lithium 1,2-perfluoroethanedisulfonylimide is preferable, since thereby sufficient effects are obtained.

Chemical formula 34

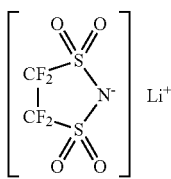  (1)

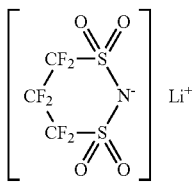  (2)

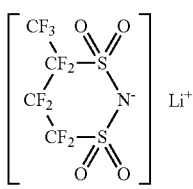  (3)

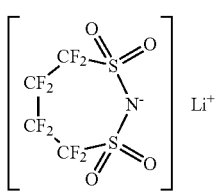  (4)

As the chain compound shown in Chemical formula 33, for example, lithium tris(trifluoro methane sulfonyl) methyde (LiC(CF$_3$SO$_2$)$_3$) or the like is cited.

The content of the electrolyte salt to the solvent is preferably 0.3 mol/kg or more and 3.0 mol/kg or less. If out of the foregoing range, there is a possibility that the ion conductivity is significantly lowered.

The secondary battery is manufactured, for example, by the following procedure.

First, the cathode 21 is formed. First, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by a doctor blade, a bar coater or the like, which is dried. Finally, the coating is compression-molded by a rolling press machine or the like while being heated if necessary to form the cathode active material layer 21B. In this case, the coating may be compression-molded over several times.

Further, the anode 22 is formed by forming the anode active material layer 22B and the coat 22C on the both faces of the anode current collector 22A by the same procedure as that of forming the anode described above.

Next, the battery element 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between, and spirally wound in the longitudinal direction. Finally, a spirally wound body is shaped in the flat shape.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like, and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 4 to FIG. 6 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, decomposition reaction of the electrolytic solution is prevented even when charge and discharge are repeated. Accordingly, the cycle characteristics can be improved. In this case, when the anode 22 contains silicon advantageous for obtaining a high capacity, the cycle characteristics are improved. Thus, higher effects can be thereby obtained than in a case in which the anode contains other anode material such as a carbon material.

In particular, when the battery can 11 is made of a rigid metal, the anode 22 is hardly damaged when the anode active material layer 22B is expanded and shrunk compared to a case that the battery can is made of a soft film. Therefore, the cycle characteristics can be further improved. In this case, when the battery can 11 is made of iron that is more rigid than aluminum, higher effects are obtained.

Effects of the secondary battery other than the foregoing effects are similar to those of the foregoing anode.

Second Battery

Figure 7:
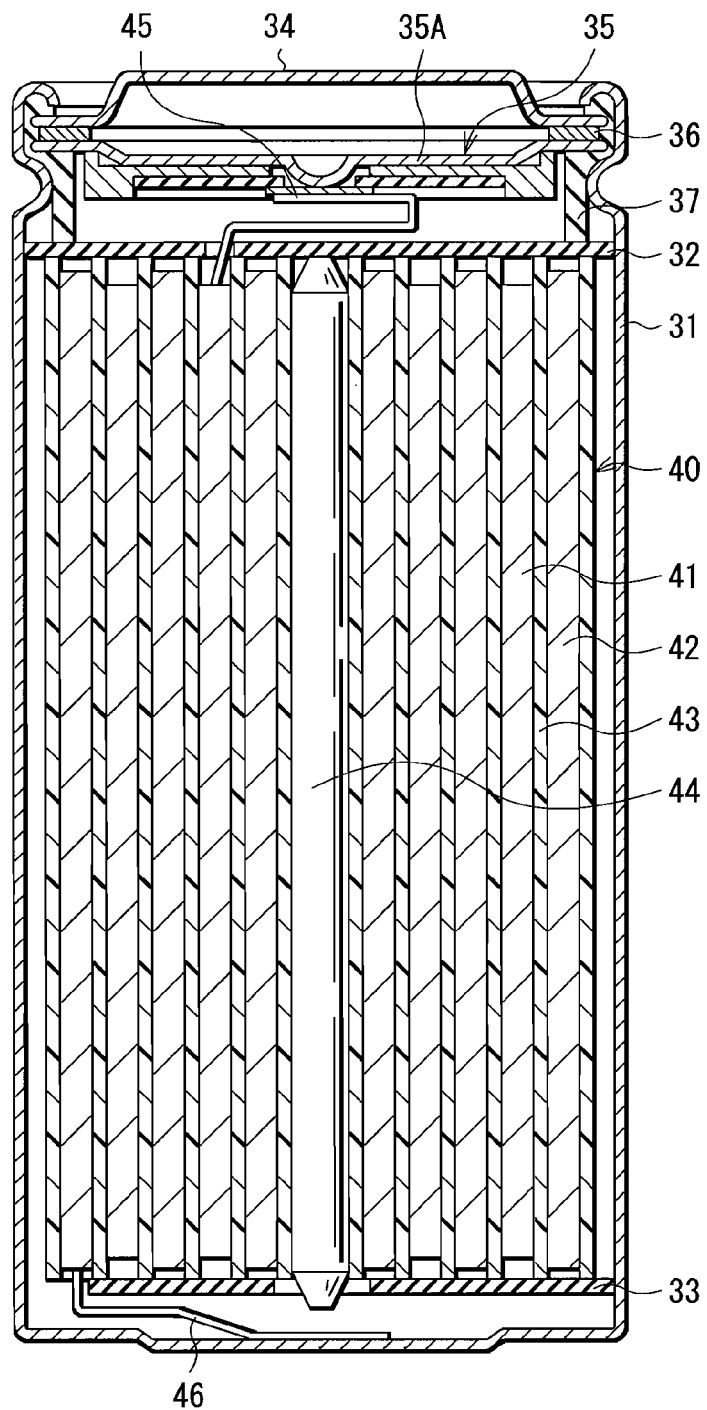
FIG. 7 is a cross section showing a structure of a second battery including the anode according to the embodiment of the invention.
Figure 8:
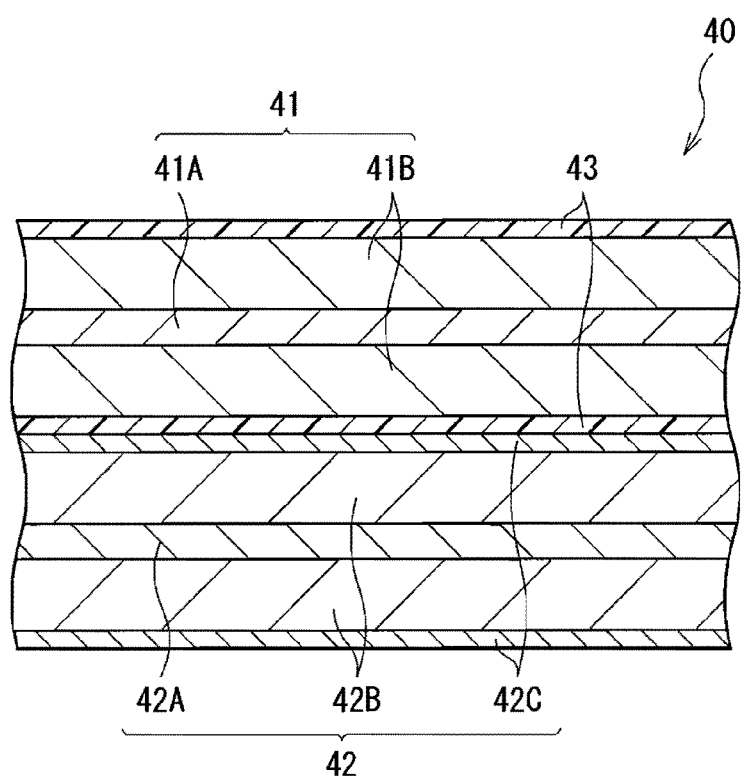
FIG. 8 is a cross section showing an enlarged part of the spirally wound electrode body shown in FIG. 7.

FIG. 7 and FIG. 8 show a cross sectional structure of a second battery. FIG. 8 shows an enlarged part of a spirally wound electrode body 40 shown in FIG. 7. The battery is a lithium ion secondary battery in which the capacity of an anode 42 is expressed based on insertion and extraction of lithium as an electrode reactant as described above. The battery mainly contains the spirally wound electrode body 40 in which a cathode 41 and the anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 with the PTC device 36 in between. In the safety valve mechanism 35, when the internal pressure becomes a certain level or more by internal short circuit, external heating or the like, a disk plate 35A flips to cut the electric connection between the battery cover 34 and the spirally wound electrode body 40. When temperature rises, the PTC device 36 increases the resistance and thereby limits a current to prevent abnormal heat generation resulting from a large current. The gasket 37 is made of, for example, an insulating material and its surface is coated with asphalt.

A center pin 44 may be inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the foregoing anode, for example, a structure in which an anode active material layer 42B and a coat 42C are provided on the both faces of a strip-shaped anode current collector 42A. The structures of the cathode current collector 41A, the cathode active material layer 41B, the anode current collector 42A, the anode active material layer 42B, the coat 42C, and the separator 43 and the composition of the electrolytic solution are respectively similar to the structures of the cathode current collector 21A, the cathode active material layer 21B, the anode current collector 22A, the anode active material layer 22B, the coat 22C, and the separator 23 and the composition of the electrolytic solution in the foregoing first battery.

The secondary battery is manufactured, for example, as follows.

First, for example, the cathode 41 is formed by forming the cathode active material layer 41B on the both faces of the cathode current collector 41A and the anode 42 is formed by forming the anode active material layer 42B and the coat 42C on the both faces of the anode current collector 42A by respective procedures similar to the procedures of forming the cathode 21 and the anode 22 in the foregoing first battery. Subsequently, the cathode lead 45 is attached to the cathode 41, and the anode lead 46 is attached to the anode 42. Subsequently, the cathode 41 and the anode 42 are spirally wound with the separator 43 in between, and thereby the spirally wound electrode body 40 is formed. The end of the cathode lead 45 is connected to the safety valve mechanism 35, and the end of the anode lead 46 is connected to the battery can 31. After that, the spirally wound electrode body 40 is sandwiched between the pair of insulating plates 32 and 33, and contained in the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 7 and FIG. 8 is thereby completed.

In the secondary battery, when charged, for example, lithium ions are extracted from the cathode 41 and inserted in the anode 42 through the electrolytic solution impregnated in the separator 43. Meanwhile, when discharged, for example, lithium ions are extracted from the anode 42, and inserted in the cathode 41 through the electrolytic solution impregnated in the separator 43.

According to the cylindrical secondary battery, the anode 42 has the structure similar to that of the foregoing anode. Thus, the cycle characteristics can be improved. Effects of the secondary battery other than the foregoing effects are similar to those of the first battery.

Third Battery

Figure 9:
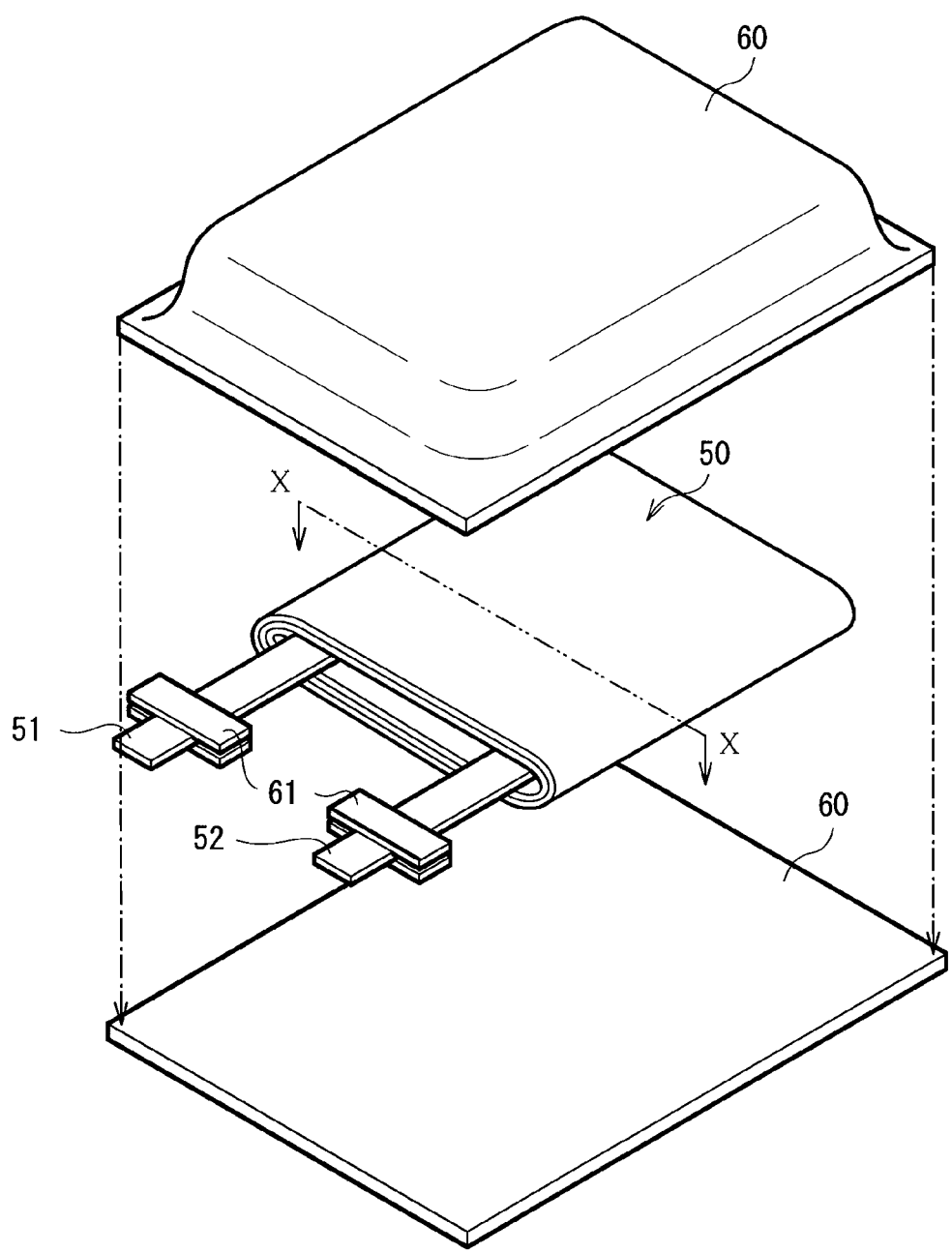
FIG. 9 is a cross section showing a structure of a third battery including the anode according to the embodiment of the invention.
Figure 10:
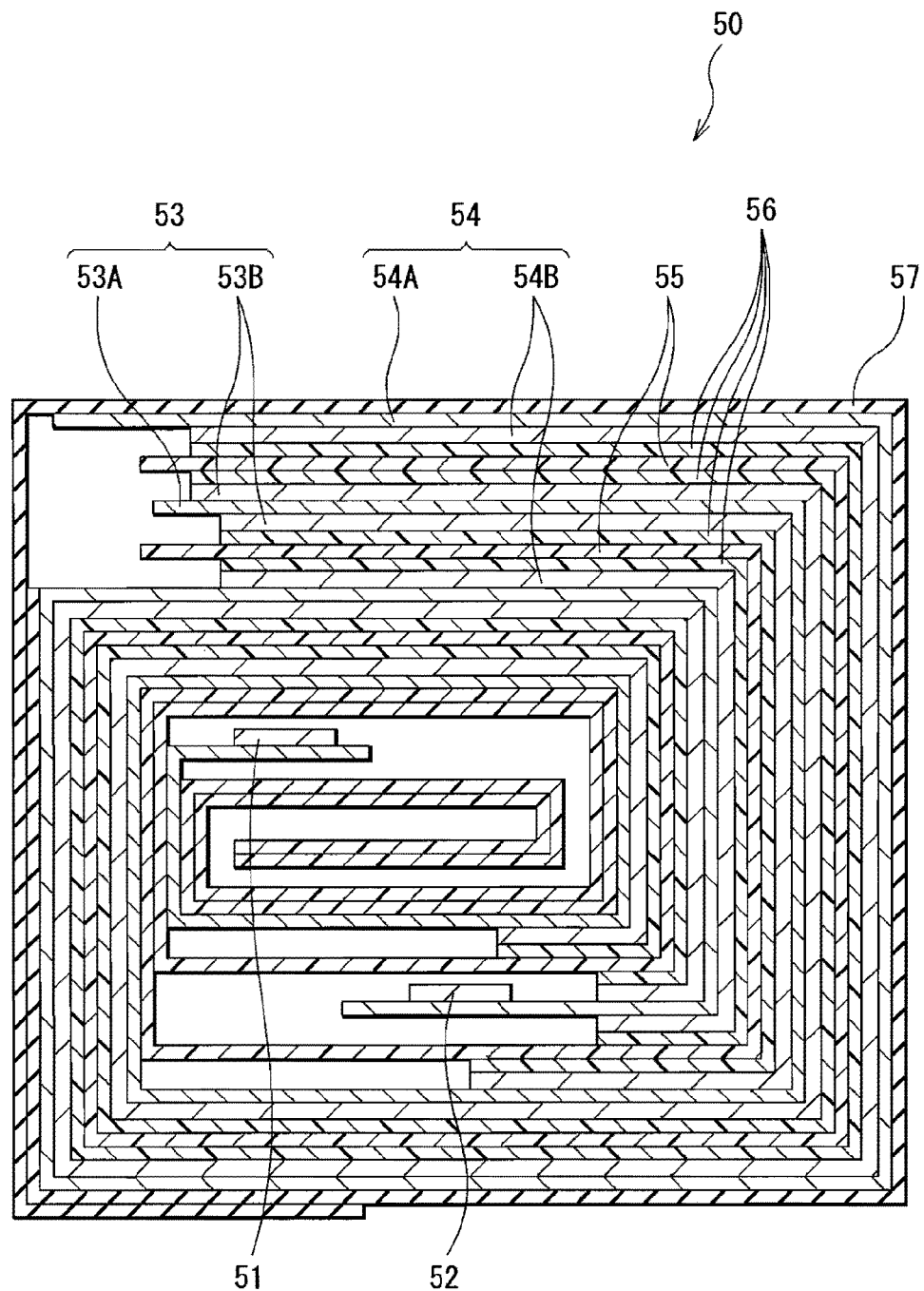
FIG. 10 is a cross section taken along line X-X of the spirally wound electrode body shown in FIG. 9.

FIG. 9 shows an exploded perspective structure of a third battery. FIG. 10 shows a cross section taken along line X-X shown in FIG. 9. The battery is, as described above, a lithium ion secondary battery in which the capacity of an anode 54 is expressed based on insertion and extraction of lithium as an electrode reactant. In the battery, a spirally wound electrode body 50 on which a cathode lead 51 and an anode lead 52 are attached is contained in a film package member 60. The battery structure including the package member 60 is a so-called laminated film structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded to each other by fusion bonding or an adhesive so that the polyethylene film and the spirally wound electrode body 50 are opposed to each other.

An adhesive film 61 to protect from entering of outside air is inserted between the package member 60 and the cathode lead 51, the anode lead 52. The adhesive film 61 is made of a material having contact characteristics to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

Figure 11:
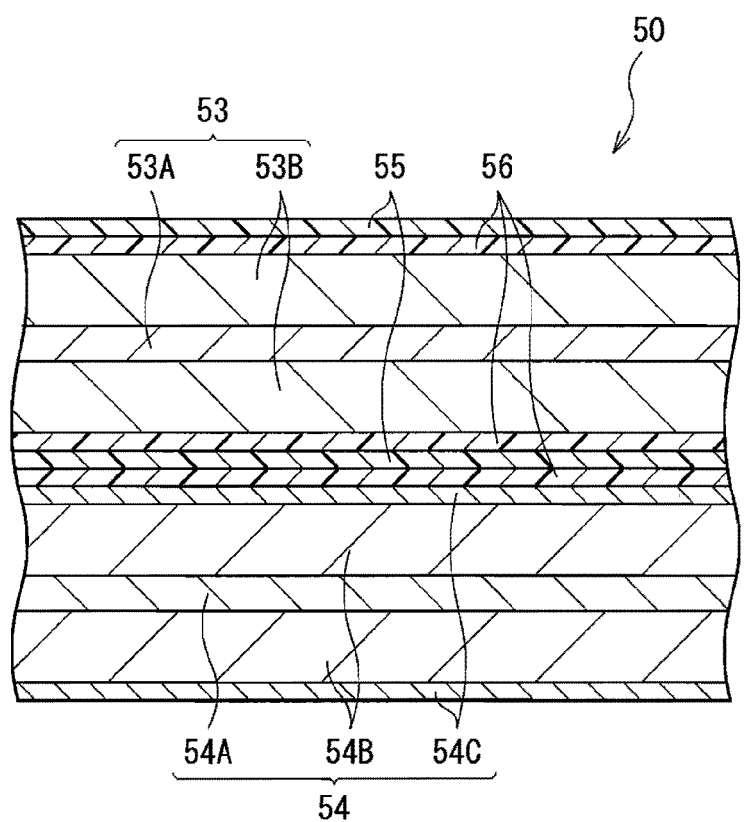
FIG. 11 is a cross section showing an enlarged part of the spirally wound electrode body shown in FIG. 10.

FIG. 11 shows an enlarged part of the spirally wound electrode body 50 shown in FIG. 10. In the spirally wound electrode body 50, a cathode 53 and an anode 54 are layered with a separator 55 and an electrolyte 56 in between and then spirally wound. The outermost periphery thereof is protected by a protective tape 57.

The cathode 53 has a structure in which, for example, a cathode active material layer 53B is provided on the both faces of a cathode current collector 53A having a pair of opposed faces. The anode 54 has a structure similar to that of the foregoing anode, for example, has a structure in which an anode active material layer 54B and a coat 54C are provided on the both faces of a strip-shaped anode current collector 54A. The structures of the cathode current collector 53A, the cathode active material layer 53B, the anode current collector 54A, the anode active material layer 54B, the coat 54C, and the separator 55 are respectively similar to those of the cathode current collector 21A, the cathode active material layer 21B, the anode current collector 22A, the anode active material layer 22B, the coat 22C, and the separator 23 of the foregoing first battery.

The electrolyte 56 is a so-called gel electrolyte, containing an electrolytic solution and a polymer compound that holds the electrolytic solution. The gel electrolyte is preferable, since thereby high ion conductivity (for example, 1 mS/cm or more at room temperature) is obtained and liquid leakage can be prevented.

As the polymer compound, for example, polyacrylonitrile, polyvinylidene fluoride, a copolymer of polyvinylidene fluoride and polyhexafluoro propylene, polytetrafluoro ethylene, polyhexafluoro propylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like is cited. One of these polymer compounds may be used singly, or a plurality thereof may be used by mixture. Specially, as a polymer compound, polyacrylonitrile, polyvinylidene fluoride, polyhexafluoro propylene, polyethylene oxide or the like is preferably used, since such a compound is electrochemically stable.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three manufacturing methods.

In the first manufacturing method, first, the cathode 53 is formed by forming the cathode active material layer 53B on the both faces of the cathode current collector 53A, and the anode 34 is formed by forming the anode active material layer 54B and the coat 54C on the both faces of the anode current collector 54A by a procedure similar to that of the method of manufacturing the first battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is welded to the cathode current collector 53A, and the anode lead 52 is welded to the anode current collector 54A. Subsequently, the cathode 53 and the anode 54 provided with the electrolyte 56 are layered with the separator 55 in between to obtain a laminated body. After that, the laminated body is spirally wound in the longitudinal direction, the protective tape 57 is adhered to the outermost periphery thereof to form the spirally wound electrode body 50. Finally, for example, after the spirally wound electrode body 50 is sandwiched between 2 pieces of the film package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery shown in FIG. 9 to FIG. 11 is completed.

In the second manufacturing method, first, the cathode lead 51 is welded to the cathode 53, and the anode lead 52 is welded to the anode 54. After that, the cathode 53 and the anode 54 are layered with the separator 55 in between and spirally wound. The protective tape 57 is adhered to the outermost periphery thereof, and thereby a spirally wound body as a precursor of the spirally wound electrode body 50 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In the third manufacturing method, the spirally wound body is formed and contained in the pouch-like package member 60 in the same manner as that of the foregoing second manufacturing method, except that the separator 55 with the both faces coated with a polymer compound is used firstly. As the polymer compound with which the separator 55 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoro propylene as a component, a ternary copolymer containing vinylidene fluoride, hexafluoro propylene, and chlorotrifluoroethylene as a component and the like are cited. As a polymer compound, in addition to the foregoing polymer containing vinylidene fluoride as a component, another one or more polymer compounds may be contained. Subsequently, an electrolytic solution is injected into the package member 60. After that, the opening of the package member 60 is sealed by thermal fusion bonding or the like. Finally, the resultant is heated while a weight is applied to the package member 60, and the separator 55 is contacted to the cathode 53 and the anode 54 with the polymer compound in between. Thereby, the electrolytic solution is impregnated into the polymer compound, and the polymer compound is gelated to form the electrolyte 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly left in the electrolyte 56 compared to the second manufacturing method, and the formation step of the polymer compound is favorably controlled. Thus, sufficient contact characteristics are obtained between the cathode 53/the anode 54/the separator 55 and the electrolyte 56.

According to the laminated film secondary battery, the anode 54 has the structure similar to that of the foregoing anode. Thus, the cycle characteristics can be improved. Effects of the secondary battery other than the foregoing effects are similar to those of the first battery.

EXAMPLES

Examples of the invention will be described in detail.

Example 1-1

The laminated film secondary battery shown in FIG. 9 to FIG. 11 was manufactured by the following procedure. The secondary battery was manufactured as a lithium ion secondary battery in which the capacity of the anode 54 was expressed based on insertion and extraction of lithium.

First, the cathode 53 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 6 parts by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Finally, the both faces of the cathode current collector 53A made of a strip-shaped aluminum foil (thickness: 12 μm thick) were uniformly coated with the cathode mixture slurry, which was dried. After that, the resultant was compression-molded by a roll pressing machine to form the cathode active material layer 53B.

Next, the anode 54 was formed. First, the anode current collector 54A made of an electrolytic copper foil (thickness: 18 μm, ten point height roughness profile Rz: 3.5 μm) was prepared. Subsequently, as an anode active material, silicon was deposited on the both faces of the anode current collector 54A by electron beam evaporation method using a deflective electron beam evaporation source, and thereby the anode active material layer 54B containing a plurality of particulate anode active materials was formed. When the anode active material layer 54B was formed, silicon with the purity of 99% was used as the evaporation source, the deposition rate was 10 nm/sec, and the anode active material was formed to have a single layer structure (thickness: 7.5 μm). Further, oxygen gas and if necessary moisture vapor were continuously introduced into the chamber so that the oxygen content in the anode active material was 3 atomic %. Finally, the fluorine resin having the structure shown in Chemical formula 1 was dispersed in a Galden solvent to prepare a 2 wt % solution. The anode current collector 54A on which the anode active material layer 54B was formed was dipped into the solution over 30 sec, taken out, and dried to form the coat 54C. When the coat 54C was formed, as the fluorine resin having the structure shown in Chemical formula 3 and Chemical formula 4 (X=Chemical formula 1), a fluorine resin in which the terminals (R1 and R2) have the structure shown in Chemical formula 18(1) was used.

Next, after ethylene carbonate (EC) and diethyl carbonate (DEC) were mixed as a solvent, lithium hexafluorophosphate ($LiPF_6$) was dissolved therein as an electrolyte salt to prepare an electrolytic solution. The composition of the solvent (EC:DEC) was 50:50 at a weight ratio. The concentration of the electrolyte salt in the electrolytic solution was 1 mol/kg.

Next, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the 3-layer separator 55 (thickness: 23 μm) in which a film made of a porous polyethylene as a main component was sandwiched between films made of porous polypropylene as a main component, the anode 54, and the foregoing polymer separator 55 were layered in this order. The resultant laminated body was spirally wound in the longitudinal direction, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a 3-layer laminated film (total thickness: 100 μm) in which a nylon film (thickness: 30 μm), an aluminum foil (thickness: 40 μm), and a non-stretch polypropylene (thickness 30 μm) were layered from the outside. After that, outer edges other than an edge of one side of the package members were thermally fusion-bonded to each other. Thereby, the spirally wound body was contained in the package members 60 in a pouched state. Subsequently, an electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film secondary battery was completed.

Examples 1-2 to 1-4

A procedure was performed in the same manner as that of Example 1-1, except that a fluorine resin in which R1 and R2 had the structure shown in Chemical formula 18(2) (Example 1-2), a fluorine resin in which R1 and R2 had the structure shown in Chemical formula 18(3) (Example 1-3), or a fluorine resin in which R1 and R2 had the structure shown in Chemical formula 18(4) (Example 1-4) were used instead of the fluorine resin in which R1 and R2 had the structure shown in Chemical formula 18(1).

Examples 1-5 to 1-11

A procedure was performed in the same manner as that of Example 1-1, except that a fluorine resin in which R1 and R2 had the structure shown in Chemical formula 19(1) (Example 1-5), a fluorine resin in which R1 and R2 had the structure shown in Chemical formula 19(2) (Example 1-6), a fluorine resin in which R1 and R2 had the structure shown in Chemical formula 19(3) (Example 1-7), a fluorine resin in which R1 and R2 had the structure shown in Chemical formula 19(4) (Example 1-8), a fluorine resin in which R1 and R2 had the structure shown in Chemical formula 19(5) (Example 1-9), a fluorine resin in which R1 and R2 had the structure shown in Chemical formula 19(6) (Example 1-10), or a fluorine resin in which R1 or R2 had the structure shown in Chemical formula 19(7) (Example 1-11) was used instead of the fluorine resin in which R1 and R2 had the structure shown in Chemical formula 18(1).

Examples 1-12 to 1-16

A procedure was performed in the same manner as that of Example 1-1, except that a fluorine resin in which R1 and R2 had the structure shown in Chemical formula 20(1) (Example 1-12), a fluorine resin in which R1 and R2 had the structure shown in Chemical formula 20(2) (Example 1-13), a fluorine resin in which R1 and R2 had the structure shown in Chemical formula 20(3) (Example 1-14), a fluorine resin in which R1 and R2 had the structure shown in Chemical formula 20(4) (Example 1-15), or a fluorine resin in which R1 and R2 had the structure shown in Chemical formula 20(5) (Example 1-16) was used instead of the fluorine resin in which R1 and R2 had the structure shown in Chemical formula 18(1).

Example 1-17

A procedure was performed in the same manner as that of Example 1-1, except that a fluorine resin in which R1 and R2 were a trifluoromethyl group was used instead of the fluorine resin in which R1 and R2 had the structure shown in Chemical formula 18(1).

Comparative Example 1

A procedure was performed in the same manner as that of Example 1-1, except that the coat 54C was not formed.

When the cycle characteristics of the secondary batteries of Examples 1-1 to 1-17 and Comparative example 1 were examined, the results shown in Table 1 were obtained.

In examining the cycle characteristics, first, to stabilize the battery state, charge and discharge were performed one cycle at 23 deg C. After that, charge and discharge were performed in the same atmosphere to measure the discharge capacity at the second cycle. Subsequently, the secondary battery was charged and discharged 99 cycles in the same atmosphere, and thereby the discharge capacity at the 101st cycle was measured. After that, the discharge capacity retention ratio (%)=(discharge capacity at the 101st cycle/ discharge capacity at the second cycle)×100 was calculated. At the time of charge, charge was performed at the constant current density of 3 mA/cm$^2$ until the battery voltage reached 4.2 V, and then charge was continuously performed at the constant voltage of 4.2 V until the current density reached 0.3 mA/cm$^2$. In discharge, discharge was performed at the constant current density of 3 mA/cm$^2$ until the battery voltage reached 2.5 V.

The procedure and the conditions for examining the cycle characteristics were similarly applied to the following series of examples and comparative examples.

formed. In this case, in Examples 1-1 to 1-16 in which the terminals had the structure shown in Chemical formula 18(1) or the like, the discharge capacity retention ratio was significantly higher than that of Example 1-17 in which the terminals were the trifluoromethyl group. The discharge capacity retention ratio of Examples 1-1 to 1-16 tended to exceed 80%. Accordingly, it was confirmed that in the secondary battery of the invention, the cycle characteristics were improved when the coat 54C containing the fluorine resin having the structure shown in Chemical formula 1 was provided on the anode active material layer 54B. In this case, it was also confirmed that when the fluorine resin had the structure shown in Chemical formula 3 or Chemical formula 4, the characteristics were further improved.

Examples 2-1 to 2-6

A procedure was performed in the same manner as that of Examples 1-1 and 1-5 to 1-9, except that the anode active material was formed into 6-layer structure. Silicon was sequentially deposited while the anode current collector 54A was reciprocated to an evaporation source at the deposition rate of 100 nm/sec.

Examples 3-1 to 3-6

A procedure was performed in the same manner as that of Examples 1-1 and 1-5 to 1-9, except that the anode active material was formed into 12-layer structure by a step similar to that of Examples 2-1 to 2-6.

TABLE 1

Anode active material: silicon (electron beam evaporation method)
Ten points average height of roughness profile Rz: 3.5 μm
Oxygen content in the anode active material: 3 atomic %

|  | Anode active material layer Number of anode active material layers (layer) | X | Coat R1 and R2 | Discharge capacity retention ratio (%) |
|---|---|---|---|---|
| Example 1-1 | 1 | Chemical formula 1 | Chemical formula 18(1) | 88 |
| Example 1-2 |  |  | Chemical formula 18(2) | 87 |
| Example 1-3 |  |  | Chemical formula 18(3) | 87 |
| Example 1-4 |  |  | Chemical formula 18(4) | 86 |
| Example 1-5 |  |  | Chemical formula 19(1) | 85 |
| Example 1-6 |  |  | Chemical formula 19(2) | 85 |
| Example 1-7 |  |  | Chemical formula 19(3) | 84 |
| Example 1-8 |  |  | Chemical formula 19(4) | 84 |
| Example 1-9 |  |  | Chemical formula 19(5) | 84 |
| Example 1-10 |  |  | Chemical formula 19(6) | 83 |
| Example 1-11 |  |  | Chemical formula 19(7) | 83 |
| Example 1-12 |  |  | Chemical formula 20(1) | 82 |
| Example 1-13 |  |  | Chemical formula 20(2) | 82 |
| Example 1-14 |  |  | Chemical formula 20(3) | 82 |
| Example 1-15 |  |  | Chemical formula 20(4) | 81 |
| Example 1-16 |  |  | Chemical formula 20(5) | 81 |
| Example 1-17 |  |  | Trifluoro methyl group | 75 |
| Comparative example 1 | 1 | — | — | 45 |

As shown in Table 1, when the fluorine resin having the structure shown in Chemical formula 1 was used and the anode active material was formed into the single-layer structure, in Examples 1-1 to 1-17 in which the coat 54C containing the fluorine resin was formed, the discharge capacity retention ratio was significantly higher than that of Comparative example 1 in which the coat 54C was not Examples 4-1 to 4-6

A procedure was performed in the same manner as that of Examples 1-1 and 1-5 to 1-9, except that the anode active material was formed into 24-layer structure by a step similar to that of Examples 2-1 to 2-6.

Comparative Example 2

A procedure was performed in the same manner as that of Comparative example 1, except that the anode active material was formed into 6-layer structure as in Examples 2-1 to 2-6.

Comparative Example 3

A procedure was performed in the same manner as that of Comparative example 1, except that the anode active material was formed into 12-layer structure as in Examples 3-1 to 3-6.

Comparative Example 4

A procedure was performed in the same manner as that of Comparative example 1, except that the anode active material was formed into 24-layer structure as in Examples 4-1 to 4-6.

When the cycle characteristics of the secondary batteries of Examples 2-1 to 2-6, 3-1 to 3-6, and 4-1 to 4-6 and Comparative examples 2 to 4 were examined, the results shown in Table 2 to Table 4 were obtained.

TABLE 2

Anode active material: silicon (electron beam evaporation method)
Ten points average height of roughness profile Rz: 3.5 μm
Oxygen content in the anode active material: 3 atomic %

| | Anode active material layer Number of anode active material layers (layer) | Coat X | Coat R1 and R2 | Discharge capacity retention ratio (%) |
|---|---|---|---|---|
| Example 2-1 | 6 | Chemical formula 1 | Chemical formula 18(1) | 89 |
| Example 2-2 | | | Chemical formula 19(1) | 87 |
| Example 2-3 | | | Chemical formula 19(2) | 86 |
| Example 2-4 | | | Chemical formula 19(3) | 86 |
| Example 2-5 | | | Chemical formula 19(4) | 85 |
| Example 2-6 | | | Chemical formula 19(5) | 85 |
| Comparative example 2 | 6 | — | — | 46 |

TABLE 3

Anode active material: silicon (electron beam evaporation method)
Ten points average height of roughness profile Rz: 3.5 μm
Oxygen content in the anode active material: 3 atomic %

| | Anode active material layer Number of anode active material layers (layer) | Coat X | Coat R1 and R2 | Discharge capacity retention ratio (%) |
|---|---|---|---|---|
| Example 3-1 | 12 | Chemical formula 1 | Chemical formula 18(1) | 90 |
| Example 3-2 | | | Chemical formula 19(1) | 89 |
| Example 3-3 | | | Chemical formula 19(2) | 88 |
| Example 3-4 | | | Chemical formula 19(3) | 87 |
| Example 3-5 | | | Chemical formula 19(4) | 87 |
| Example 3-6 | | | Chemical formula 19(5) | 86 |
| Comparative example 3 | 12 | — | — | 47 |

TABLE 4

Anode active material: silicon (electron beam evaporation method)
Ten points average height of roughness profile Rz: 3.5 μm
Oxygen content in the anode active material: 3 atomic %

| | Anode active material layer Number of anode active material layers (layer) | Coat X | Coat R1 and R2 | Discharge capacity retention ratio (%) |
|---|---|---|---|---|
| Example 4-1 | 24 | Chemical formula 1 | Chemical formula 18(1) | 90.5 |
| Example 4-2 | | | Chemical formula 19(1) | 90 |
| Example 4-3 | | | Chemical formula 19(2) | 89 |
| Example 4-4 | | | Chemical formula 19(3) | 89 |

TABLE 4-continued

Anode active material: silicon (electron beam evaporation method)
Ten points average height of roughness profile Rz: 3.5 μm
Oxygen content in the anode active material: 3 atomic %

|  | Anode active material layer Number of anode active material layers (layer) | Coat X | R1 and R2 | Discharge capacity retention ratio (%) |
|---|---|---|---|---|
| Example 4-5 |  |  | Chemical formula 19(4) | 88 |
| Example 4-6 |  |  | Chemical formula 19(5) | 88 |
| Comparative example 4 | 24 | — | — | 48 |

As shown in Table 2 to Table 4, when the anode active material was formed into the multilayer structure, results similar to the results of Table 1 were obtained as well. That is, in Examples 2-1 to 2-6, 3-1 to 3-6, and 4-1 to 4-6 in which the coat 54C containing the fluorine resin was formed, the discharge capacity retention ratio was significantly higher than that of Comparative examples 2 to 4 in which the coat 54C was not formed. In this case, when comparison was made among Examples 1-1, 2-1, 3-1, and 4-1 that had the structure similar to each other except for the number of anode active material layers, there was a tendency that the discharge capacity retention ratio in the case that the anode active material had the multilayer structure was higher than that in the case that the anode active material had the single layer structure, and the discharge capacity retention ratio became higher as the number of layers was increased. Accordingly, it was confirmed that in the secondary battery of the invention, when the anode active material was formed into the multilayer structure, the cycle characteristics were improved as well. It was also confirmed that when the number of anode active material layers was increased, the characteristics were further improved.

Examples 5-1 to 5-7

A procedure was performed in the same manner as that of Examples 1-1, 1-5 to 1-9, and 1-17, except that the fluorine resin having the structure shown in Chemical formula 2 (X=Chemical formula 2) was used instead of the structure shown in Chemical formula 1.

Comparative Example 5

A procedure was performed in the same manner as that of Comparative example 1, except that the fluorine resin having the structure shown in Chemical formula 2 was used as in Examples 5-1 to 5-7.

When the cycle characteristics of the secondary batteries of Examples 5-1 to 5-7 and Comparative example 5 were examined, the results shown in Table 5 were obtained.

TABLE 5

Anode active material: silicon (electron beam evaporation method)
Ten points average height of roughness profile Rz: 3.5 μm
Oxygen content in the anode active material: 3 atomic %

|  | Anode active material layer Number of anode active material layers (layer) | Coat X | R1 and R2 | Discharge capacity retention ratio (%) |
|---|---|---|---|---|
| Example 5-1 | 1 | Chemical formula 2 | Chemical formula 18(1) | 87 |
| Example 5-2 |  |  | Chemical formula 19(1) | 85 |
| Example 5-3 |  |  | Chemical formula 19(2) | 84 |
| Example 5-4 |  |  | Chemical formula 19(3) | 84 |
| Example 5-5 |  |  | Chemical formula 19(4) | 83 |
| Example 5-6 |  |  | Chemical formula 19(5) | 83 |
| Example 5-7 |  |  | Trifluoromethyl group | 75 |
| Comparative example 5 | 1 | — | — | 44 |

As shown in Table 5, when the fluorine resin having the structure shown in Chemical formula 2 was used, results similar to the results of Table 1 could be obtained as well. That is, in Examples 5-1 to 5-7 in which the coat 54C containing the fluorine resin was formed, the discharge capacity retention ratio was significantly higher than that of Comparative example 5 in which the coat 54C was not formed. In this case, when the terminal (R1 and R2) had the structure shown in Chemical formula 18(1) or the like, the discharge capacity retention ratio was significantly higher than that of the case in which the terminal was the trifluoromethyl group. The discharge capacity retention ratio of the former tended to exceed 80%. Accordingly, it was confirmed that in the secondary battery of the invention, the cycle characteristics were improved when the coat 54C containing the fluorine resin having the structure shown in Chemical formula 2 was provided on the anode active material layer 54B. In this case, it was also confirmed that when the fluorine resin had the structure shown in Chemical formula 3 or Chemical formula 4, the characteristics were further improved.

Figure 12:
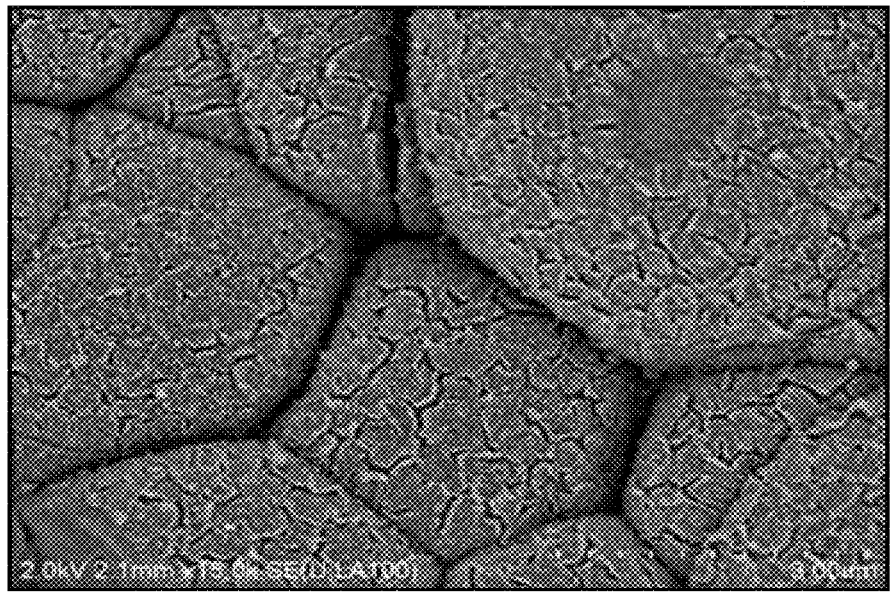
FIG. 12 is an SEM photograph showing a surface structure of an anode in Example 1-1.
Figure 13:
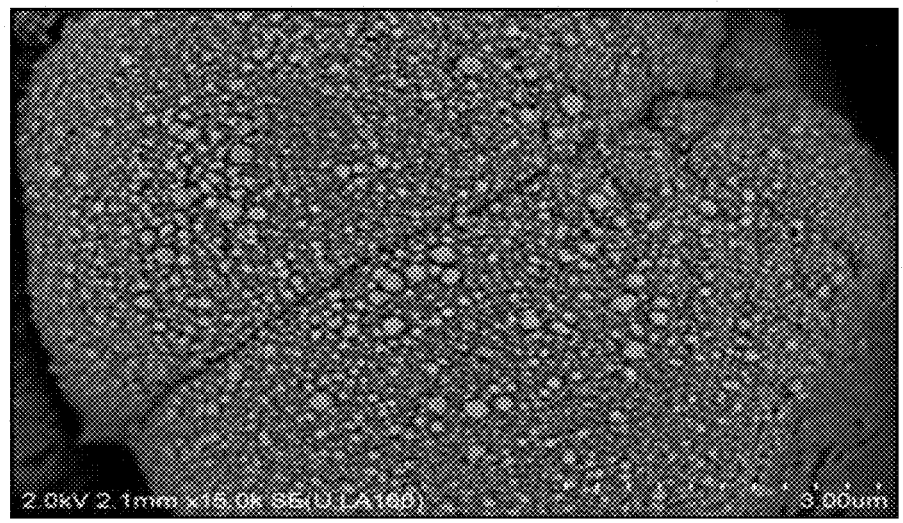
FIG. 13 is an SEM photograph showing a surface structure of an anode in Example 1-5.

As a representative of the series of examples and comparative examples described above, when the surface of the anodes 54 for the secondary batteries of Examples 1-1 and 1-5 were observed, the results shown in FIG. 12 and FIG. 13 were obtained. FIG. 12 and FIG. 13 are respectively an SEM photograph showing a cross sectional structure of the anode 54 of Examples 1-1 and 1-5. When the surface of the anode 54 was observed, a secondary battery used for examining generation state of a fluoride of the electrode reactant was manufactured besides a secondary battery used for examining the cycle characteristics. The former secondary battery was charged and discharged 30 cycles and then decomposed. Then, the anode 54 was taken out, and the surface thereof was observed by SEM.

As shown in FIG. 12 and FIG. 13, in both Example 1-1 and Example 1-5, a plurality of particulate anode active materials were observed, and a fluoride (lithium fluoride) of lithium as the electrode reactant was observed on the surface thereof. In this case, in Example 1-1 (FIG. 12), the lithium fluoride was in a state of a coat divided into a plurality of sections. Meanwhile, in Example 1-5 (FIG. 13), the lithium fluoride was in a state of a plurality of particles. Such a difference of the lithium fluoride may result from the fluorine resin type (difference of the group existing at the terminal). Accordingly, it was confirmed that in the secondary battery of the invention, when charge and discharge were performed after the coat 54C containing the fluorine resin was formed, the lithium fluoride in a state of a coat or in a state of particles were generated on the surface of the coat 54C.

Examples 6-1 to 6-4

A procedure was performed in the same manner as that of Examples 1-1, 1-5, 1-6, and 1-8, except that the anode active material layer 54B was formed by sintering method instead of electron beam evaporation method. The anode active material layer 54B was formed as follows. First, 90 parts by mass of silicon powder as an anode active material (average particle diameter: 6 μm) and 10 parts by mass of polyvinylidene fluoride as a binder were mixed to obtain an anode mixture. After that, the anode mixture was dispersed in N-methyl-2-pyrrolidone to obtain paste anode mixture slurry. Subsequently, the both faces of the anode current collector 54A were uniformly coated with the anode mixture slurry, and then such a resultant coat was compression-molded by a rolling press machine. Finally, the coat was heated at 220 deg C. for 12 hours in the vacuum atmosphere. The foregoing average particle diameter was a so-called median size. The same will be applied to the following description.

Comparative Example 6

A procedure was performed in the same manner as that of Comparative example 1, except that the anode active material layer 54B was formed by sintering method as in Examples 6-1 to 6-4.

When the cycle characteristics of the secondary batteries of Examples 6-1 to 6-4 and Comparative example 6 were examined, the results shown in Table 6 were obtained.

TABLE 6

Anode active material: silicon (sintering method)
Ten points average height of roughness profile Rz: 3.5 μm

| | Coat | | Discharge capacity retention ratio (%) |
|---|---|---|---|
| | X | R1 and R2 | |
| Example 6-1 | Chemical formula 1 | Chemical formula 18(1) | 84 |
| Example 6-2 | | Chemical formula 19(1) | 84 |
| Example 6-3 | | Chemical formula 19(2) | 83 |
| Example 6-4 | | Chemical formula 19(4) | 83 |
| Comparative example 6 | — | — | 72 |

As shown in Table 6, when the anode active material layer 54B was formed by sintering method, results similar to the results of Table 1 could be obtained as well. That is, in Examples 6-1 to 6-4 in which the coat 54C containing the fluorine resin was formed, the discharge capacity retention ratio was higher than that of Comparative example 6 in which the coat 54C was not formed. Accordingly, it was confirmed that in the secondary battery of the invention, the cycle characteristics were improved as well when the anode active material layer 54B was formed by sintering method.

Examples 7-1 to 7-4

A procedure was performed in the same manner as that of Examples 1-1, 1-5, 1-6, and 1-8, except that the anode active material layer 54B was formed by using an alloy containing tin instead of silicon as an anode active material. The anode active material layer 54B was formed as follows. First, powder tin-cobalt alloy was formed by gas atomizing method. (The atomicity ratio was Sn:Co=80:20.) After that, the resultant tin-cobalt alloy was pulverized and classified until the average particle diameter became 15 μm. Subsequently, 75 parts by mass of the tin-cobalt alloy powder as an anode active material, 20 parts by mass of scale-like graphite as an electrical conductor, and 5 parts by mass of carboxymethyl cellulose as a thickener were mixed to obtain an anode mixture. After that, the anode mixture was dispersed in pure water to obtain anode mixture slurry. Finally, the both faces of the anode current collector 54A were uniformly coated with the anode mixture slurry, and then such a resultant coat was compression-molded by a rolling press machine. The completed anode 54 was analyzed by auger electron spectrometer (AES). As a result, it was confirmed that the anode current collector 54A and the anode active material layer 54B were alloyed in at least part of the interface in between.

Comparative Example 7

A procedure was performed in the same manner as that of Comparative example 1, except that the anode active material layer 54B was formed by using a tin-cobalt alloy as an anode active material as in Examples 7-1 to 7-4.

When the cycle characteristics of the secondary batteries of Examples 7-1 to 7-4 and Comparative example 7 were examined, the results shown in Table 7 were obtained.

TABLE 7

Anode active material: tin-cobalt alloy (coating method)
Ten points average height of roughness profile Rz: 3.5 μm

| | Coat | | Discharge capacity retention ratio (%) |
|---|---|---|---|
| | X | R1 and R2 | |
| Example 7-1 | Chemical formula 1 | Chemical formula 18(1) | 83 |
| Example 7-2 | | Chemical formula 19(1) | 82 |
| Example 7-3 | | Chemical formula 19(2) | 81 |
| Example 7-4 | | Chemical formula 19(4) | 80 |
| Comparative example 7 | — | — | 75 |

As shown in Table 7, when the anode active material layer 54B was formed by using the tin-cobalt alloy, results similar to the results of Table 1 were obtained as well. That is, in Examples 7-1 to 7-4 in which the coat 54C containing the fluorine resin was formed, the discharge capacity retention ratio was higher than that of Comparative example 7 in which the coat 54C was not formed. Accordingly, it was confirmed that in the secondary battery of the invention, the cycle characteristics were improved as well when the alloy containing tin was used as an anode active material.

Examples 8-1 to 8-3

A procedure was performed in the same manner as that of Examples 1-1, 1-5, and 1-6, except that the anode active material layer 54B was formed by using a carbon material instead of silicon as an anode active material. The anode active material layer 54B was formed as follows. 87 parts by mass of mesophase carbon micro beads (MCMB: average particle diameter: 25 μm) and 3 parts by mass of graphite as an anode active material, and 10 parts by mass of polyvinylidene fluoride as a binder were mixed to obtain a cathode mixture. After that, the anode mixture was dispersed in N-methyl-2-pyrrolidone to obtain paste anode mixture slurry. After that, the both faces of the anode current collector 54A were uniformly coated with the anode mixture slurry, dried, and then such a resultant coat was compression-molded by a rolling press machine.

Comparative Example 8

A procedure was performed in the same manner as that of Comparative example 1, except that the anode active material layer 54B was formed by using the carbon material as an anode active material as in Examples 8-1 to 8-3.

When the cycle characteristics of the secondary batteries of Examples 8-1 to 8-3 and Comparative example 8 were examined, the results shown in Table 8 were obtained.

TABLE 8

Anode active material: MCMB (coating method)
Ten points average height of roughness profile Rz: 3.5 μm

| | Coat | | Discharge capacity retention ratio (%) |
|---|---|---|---|
| | X | R1 and R2 | |
| Example 8-1 | Chemical formula 1 | Chemical formula 18(1) | 90 |
| Example 8-2 | | Chemical formula 19(1) | 90 |
| Example 8-3 | | Chemical formula 19(2) | 90 |
| Comparative example 8 | — | — | 87 |

As shown in Table 8, when the anode active material layer 54B was formed by using the carbon material, results similar to the results of Table 1 were obtained as well. That is, in Examples 8-1 to 8-3 in which the coat 54C containing the fluorine resin was formed, the discharge capacity retention ratio was higher than that of Comparative example 7 in which the coat 54C was not formed. Accordingly, it was confirmed that in the secondary battery of the invention, the cycle characteristics were improved as well when the carbon material was used as an anode active material.

Examples 9-1 to 9-6

A procedure was performed in the same manner as that of Example 4-1, except that the oxygen content in the anode active material was changed to 2 atomic % (Example 19-1), 10 atomic % (Example 9-2), 20 atomic % (Example 9-3), 30 atomic % (Example 9-4), 40 atomic % (Example 9-5), or 45 atomic % (Example 9-6) instead of 3 atomic %.

Figure 14:
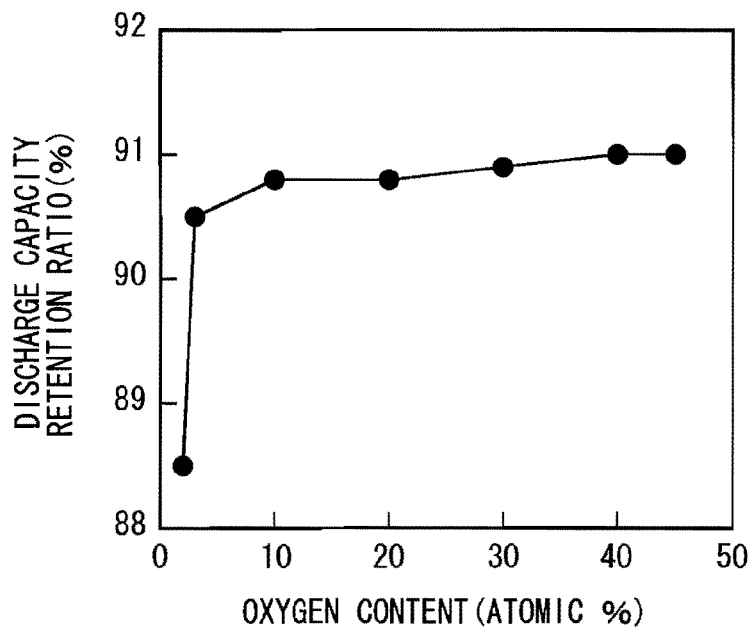
FIG. 14 is a diagram showing a correlation between an oxygen content in an anode active material and a discharge capacity retention ratio.

When the cycle characteristics of the secondary batteries of Examples 9-1 to 9-6 were examined, the results shown in Table 9 and FIG. 14 were obtained.

TABLE 9

Anode active material: silicon (electron beam evaporation method)
Ten points average height of roughness profile Rz = 3.5 μm

| | Anode active material layer | | Coat | | Discharge capacity retention ratio (%) |
|---|---|---|---|---|---|
| | Number of anode active material particle layers (layer) | Oxygen content (atomic %) | X | R1 and R2 | |
| Example 9-1 | 24 | 2 | Chemical formula 1 | Chemical formula 18(1) | 88.5 |
| Example 4-1 | | 3 | | | 90.5 |
| Example 9-2 | | 10 | | | 90.8 |
| Example 9-3 | | 20 | | | 90.8 |
| Example 9-4 | | 30 | | | 90.9 |

TABLE 9-continued

Anode active material: silicon (electron beam evaporation method)
Ten points average height of roughness profile Rz = 3.5 μm

| | Anode active material layer | | | | Discharge capacity retention ratio (%) |
|---|---|---|---|---|---|
| | Number of anode active material particle layers (layer) | Oxygen content (atomic %) | Coat | | |
| | | | X | R1 and R2 | |
| Example 9-5 | | 40 | | | 91 |
| Example 9-6 | | 45 | | | 91 |
| Comparative example 4 | 24 | 3 | — | — | 48 |

As shown in Table 9, in Examples 9-1 to 9-6 in which the oxygen content in the anode active material was different, the discharge capacity retention ratio was significantly higher as in Example 4-1 than that of Comparative example 4. In this case, as shown in Table 9 and FIG. 14, as the oxygen content was increased, the discharge capacity retention ratio tended to be increased and then became almost constant. If the oxygen content was smaller than 3 atomic %, the discharge capacity retention ratio tended to be largely decreased. However, if the oxygen content was larger than 40 atomic %, the battery capacity tended to be lowered though the discharge capacity retention ratio tended to be increased. Accordingly, it was confirmed that in the secondary battery of the invention, the cycle characteristics were improved as well when the oxygen content in the anode active material was changed. Further, it was confirmed that if the oxygen content was 3 atomic % or more, the characteristics were further improved, and if the oxygen content was 3 atomic % or more and 40 atomic % or less, the battery capacity was secured.

Examples 10-1 to 10-6

A procedure was performed in the same manner as that of Example 4-1, except that the anode active material containing both silicon and a metal element was deposited by using silicon with purity of 99% and the metal element with purity of 99.9% as evaporation sources. As the metal element, iron (Example 10-1), cobalt (Example 10-2), nickel (Example 10-3), chromium (Example 10-4), titanium (Example 10-5), or molybdenum (Example 10-6) was used. The evaporation amount of the metal element was adjusted so that the metal element content in the anode active material was 5 atomic %.

When the cycle characteristics of the secondary batteries of Examples 10-1 to 10-6 were examined, the results shown in Table 10 were obtained.

TABLE 10

Anode active material: silicon (electron beam evaporation method)
Ten points average height of roughness profile Rz = 3.5 μm
Oxygen content in the anode active material: 3 atomic %

| | Anode active material layer | | | | Discharge capacity retention ratio (%) |
|---|---|---|---|---|---|
| | Number of anode active material particle layers (layer) | Metal element | Coat | | |
| | | | X | R1 and R2 | |
| Example 4-1 | 24 | — | Chemical formula 1 | Chemical formula 18(1) | 90.5 |
| Example 10-1 | | Fe | | | 91.1 |
| Example 10-2 | | Co | | | 92.1 |
| Example 10-3 | | Ni | | | 91 |
| Example 10-4 | | Cr | | | 91.1 |
| Example 10-5 | | Ti | | | 91.2 |
| Example 10-6 | | Mo | | | 91.5 |

As shown in Table 10, in Examples 10-1 to 10-6 in which the anode active material contained the metal element together with silicon, the discharge capacity retention ratio was higher than that of Example 4-1 in which the anode active material did not contain the metal element. Accordingly, it was confirmed that in the secondary battery of the invention, the cycle characteristics were further improved when the anode active material contained the metal element.

Examples 11-1 to 11-3

A procedure was performed in the same manner as that of Example 4-1, except that the anode active material was deposited so that the first oxygen-containing region and the second oxygen-containing region having a higher oxygen content than that of the first oxygen-containing region were alternately layered by depositing silicon while intermittently introducing oxygen gas or the like into a chamber, instead of making the anode active material contain oxygen by depositing silicon while continuously introducing oxygen gas or the like into a chamber. The oxygen content in the second oxygen-containing region was 3 atomic %, and the number thereof was 6 (Example 11-1), 12 (Example 11-2), or 24 (Example 11-3).

Figure 15:
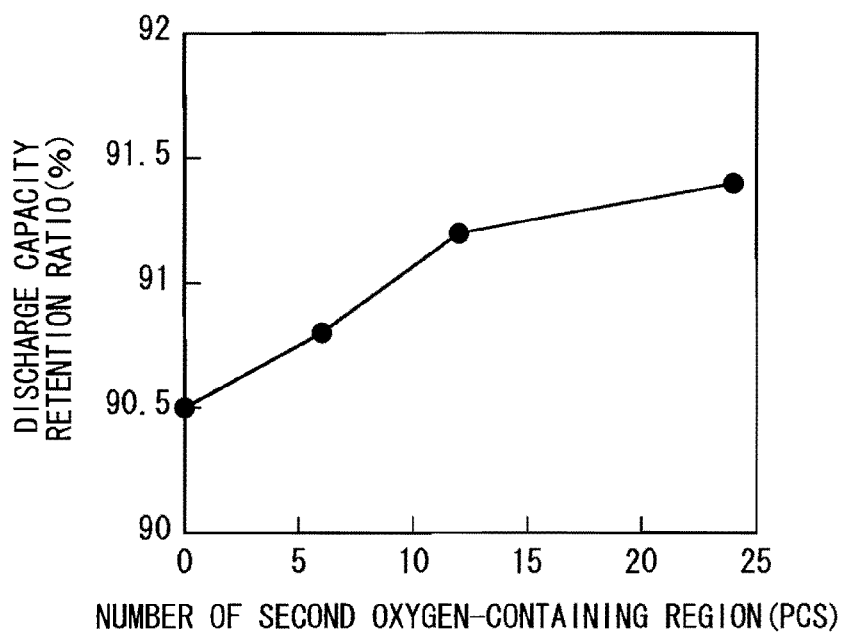
FIG. 15 is a diagram showing a correlation between the number of the second oxygen-containing regions and a discharge capacity retention ratio.

When the cycle characteristics of the secondary batteries of Examples 11-1 to 11-3 were examined, the results shown in Table 11 and FIG. 15 were obtained.

TABLE 11

Anode active material: silicon (electron beam evaporation method)
Ten points average height of roughness profile Rz = 3.5 μm
Oxygen content in the anode active material: 3 atomic %

| | Anode active material layer | | Coat | | Discharge capacity retention ratio (%) |
|---|---|---|---|---|---|
| | Number of anode active material particle layers (layer) | Number of second oxygen-containing regions (pcs) | X | R1 and R2 | |
| Example 4-1 | 24 | — | Chemical formula 1 | Chemical formula 18(1) | 90.5 |
| Example 11-1 | | 6 | | | 90.8 |
| Example 11-2 | | 12 | | | 91.2 |
| Example 11-3 | | 24 | | | 91.4 |

As shown in Table 11 and FIG. 15, in Examples 11-1 to 11-3 in which the anode active material had the first and the second oxygen-containing regions, the discharge capacity retention ratio was higher than that of Example 4-1 in which the anode active material did not contain the first and the second oxygen-containing regions. In this case, as the number of the second oxygen-containing regions was increased, the discharge capacity retention ratio tended to be higher. Accordingly, it was confirmed that in the secondary battery of the invention, the cycle characteristics were improved when the anode active material had the first and the second oxygen-containing regions. Further, it was confirmed that as the number of the second oxygen-containing regions was increased, the characteristics were further improved.

Example 12-1

A procedure was performed in the same manner as that of Example 1-1, except that the anode active material layer 54B (thickness: 6.2 μm) was formed by RF magnetron sputtering method instead of electron beam evaporation method. At that time, silicon with purity of 99.99% was used as a target, and the deposition rate was 0.5 nm/sec.

Example 12-2

A procedure was performed in the same manner as that of Example 1-1, except that the anode active material layer 54B (thickness: 6.3 μm) was formed by CVD method instead of electron beam evaporation method. At that time, silane and argon were used respectively as a raw material and excitation gas, the deposition rate and the substrate temperature were respectively 1.5 nm/sec and 200 deg C.

When the cycle characteristics of the secondary batteries of Examples 12-1 and 12-2 were examined, the results shown in Table 12 were obtained.

TABLE 12

Anode active material: silicon (electron beam evaporation method)
Ten points average height of roughness profile Rz = 3.5 μm
Oxygen content in the anode active material = 3 atomic %

| | Anode active material layer | | Coat | | Discharge capacity retention ratio (%) |
|---|---|---|---|---|---|
| | Number of anode active material particle layers (layer) | Forming method | X | R1 and R2 | |
| Example 1-1 | 1 | Electron beam evaporation method | Chemical formula 1 | Chemical formula 18(1) | 88 |
| Example 12-1 | | Sputtering method | | | 85 |
| Example 12-2 | | CVD method | | | 86 |
| Comparative example 1 | 1 | Electron beam evaporation method | — | — | 45 |

As shown in Table 12, in Examples 12-1 and 12-2 in which the method of forming the anode active material layer 54B was different, the discharge capacity retention ratio was higher as in Example 1-1 than that of Comparative example 1. In this case, the discharge capacity retention ratio tended to be increased in the case of using electron beam evaporation method than in the case of using sputtering method and in the case of using CVD method. Accordingly, it was confirmed that in the secondary battery of the invention, the cycle characteristics were improved as well when the method of forming the anode active material layer 54B was changed. Further, it was confirmed that when evaporation method was used, the characteristics were further improved.

Examples 13-1 to 13-7

A procedure was performed in the same manner as that of Example 4-1, except that the ten points average height of roughness profile Rz of the surface of the anode current collector 54A was changed to 1 μm (Example 3-1), 1.5 μm (Example 13-2), 2.5 μm (Example 13-3), 4.5 μm (Example 13-4), 5.5 μm (Example 13-5), 6.5 μm (Example 13-6), or 7 μm (Example 13-7) instead of 3.5 μm.

Figure 16:
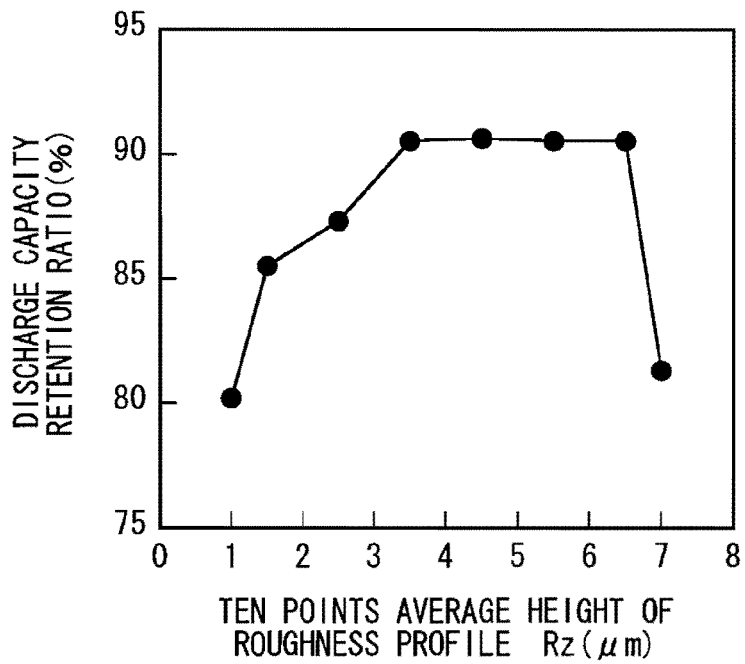
FIG. 16 is a diagram showing a correlation between ten points average height of roughness profile of the surface of the anode current collector and a discharge capacity retention ratio.

When the cycle characteristics of the secondary batteries of Examples 13-1 to 13-7 were examined, the results shown in Table 13 and FIG. 16 were obtained.

shown in FIG. 4 to FIG. 6 was manufactured by the following procedure instead of the laminated film secondary battery.

First, the cathode 21 and the anode 22 were formed. After that, the cathode lead 24 made of aluminum was welded to the cathode current collector 21A and the anode lead 25

TABLE 13

Anode active material: silicon (electron beam evaporation method)
Ten points average height of roughness profile Rz = 3.5 μm
Oxygen content in the anode active material = 3 atomic %

|  | Anode current collector Ten points average height of roughness profile Rz (μm) | Anode active material layer Number of anode active material particle layers (layer) | Coat | | Discharge capacity retention ratio (%) |
|---|---|---|---|---|---|
|  |  |  | X | R1 and R2 |  |
| Example 13-1 | 1 | 24 | Chemical formula 1 | Chemical formula 18(1) | 80.2 |
| Example 13-2 | 1.5 |  |  |  | 85.5 |
| Example 13-3 | 2.5 |  |  |  | 87.3 |
| Example 4-1 | 3.5 |  |  |  | 90.5 |
| Example 13-4 | 4.5 |  |  |  | 90.6 |
| Example 13-5 | 5.5 |  |  |  | 90.5 |
| Example 13-6 | 6.5 |  |  |  | 90.2 |
| Example 13-7 | 7 |  |  |  | 81.3 |
| Comparative example 4 | 3.5 | 24 | — | — | 48 |

As shown in Table 13, in Examples 13-1 to 13-7 in which the ten points average height of roughness profile Rz was different, the discharge capacity retention ratio was largely higher as in Example 4-1 than that of Comparative example 4. In this case, as shown in Table 13 and FIG. 16, as the ten points average height of roughness profile Rz was increased, the discharge capacity retention ratio tended to be increased and then decreased, and if the ten points average height of roughness profile Rz was smaller than 1.5 μm or larger than 6.5 μm, the discharge capacity retention ratio tended to be extremely lowered. Accordingly, it was confirmed that in the secondary battery of the invention, the cycle characteristics were improved as well if the ten points average height of roughness profile Rz of the surface of the anode current collector 54A was changed. Further, it was confirmed that if the ten points average height of roughness profile Rz was 1.5 μm or more and 6.5 μm or less, the characteristics were further improved.

Example 14-1

A procedure was performed in the same manner as that of Example 4-1, except that the square secondary battery made of nickel was welded to the anode current collector 22A. Subsequently, the cathode 21, the separator 23, and the anode 22 were layered in this order, and spirally wound in the longitudinal direction, and then formed in the flat shape. Thereby, the battery element 20 was formed. Subsequently, the battery element 20 was contained in the battery can 11 made of aluminum. After that, the insulating plate 12 was arranged on the battery element 20. Subsequently, the cathode lead 24 and the anode lead 25 were respectively welded to the cathode pin 15 and the battery can 11. After that, the battery cover 13 was fixed to the open end of the battery can 11 by laser welding. Finally, the electrolytic solution was injected into the battery can 11 through the injection hole 19. After that, the injection hole 19 was sealed by the sealing member 19A, and thereby the square battery was completed.

Example 14-2

A procedure was performed in the same manner as that of Example 14-1, except that the battery can 11 made of iron was used instead of the battery can 11 made of aluminum.

When the cycle characteristics of the secondary batteries of Examples 14-1 and 14-2 were examined, the results shown in Table 14 were obtained.

TABLE 14

Anode active material: silicon (electron beam evaporation method)
Ten points average height of roughness profile Rz = 3.5 μm
Oxygen content in the anode active material = 3 atomic %

|  | Battery structure | Anode active material layer Number of anode active material particle layers (layer) | Coat | | Discharge capacity retention ratio (%) |
|---|---|---|---|---|---|
|  |  |  | X | R1 and R2 |  |
| Example 4-1 | Laminated film | 24 | Chemical formula 1 | Chemical formula 18(1) | 90.5 |

TABLE 14-continued

Anode active material: silicon (electron beam evaporation method)
Ten points average height of roughness profile Rz = 3.5 μm
Oxygen content in the anode active material = 3 atomic %

| Battery structure | Anode active material layer Number of anode active material particle layers (layer) | Coat X | Coat R1 and R2 | Discharge capacity retention ratio (%) |
|---|---|---|---|---|
| Example 14-1 | Square (aluminum) | | | | 91.2 |
| Example 14-2 | Square (iron) | | | | 92.3 |
| Comparative example 4 | Laminated film | 24 | — | — | 48 |

As shown in Table 14, in Examples 14-1 and 14-2 in which the battery structure was different, the discharge capacity retention ratio was largely higher as in Example 4-1 than that of Comparative example 4 as well. In this case, the discharge capacity retention ratio of Examples 14-1 and 14-2 tended to be higher than that of Example 4-1, and the discharge capacity retention ratio in the case that the battery can 11 was made of iron was higher than that in the case that the battery can 11 was made of aluminum. Accordingly, it was confirmed that in the secondary battery of the invention, the cycle characteristics were improved as well when the battery structure was changed. Further, it was confirmed that in the case that the battery structure was the square type, the cycle characteristics were further improved than that in the case that the battery structure was the laminated film type, and the cycle characteristics were further improved in the case that the battery can 11 made of iron was used. Though no specific examples for a cylindrical secondary battery in which the package member is made of a metal material have been herein given, it is evident that similar effects are obtained in such a cylindrical secondary battery since the cycle characteristics and the swollenness characteristics were improved in the square secondary battery including the package member made of the metal material than in the laminated film secondary battery.

Example 15-1

A procedure was performed in the same manner as that of Example 4-1, except that 4-fluoro-1,3-dioxolane-2-one (FEC) as a cyclic ester carbonate having halogen shown in Chemical formula 22 was used instead of EC as a solvent.

Example 15-2

A procedure was performed in the same manner as that of Example 15-1, except that as an electrolyte salt, lithium tetrafluoroborate (LiBF$_4$) was added and sulfobenzoic acid anhydride (SBAH) was added as an acid anhydride. While the concentration of the lithium hexafluoroborate in the electrolytic solution was kept 1 mol/kg, the concentration of tetrafluoroborate in the electrolytic solution was set to 0.05 mol/kg. Further, the content of the SBAH in the solvent was 1 wt %. "Wt %" herein means a unit where the entire solvent was 100 wt %. The same will be applied to the following descriptions.

Example 15-3

A procedure was performed in the same manner as that of Example 15-2, except that propylene carbonate (PC) was added as a solvent. The composition of the solvent (PC:FEC:DEC) was 20:30:50 at a weight ratio.

Examples 15-4

A procedure was performed in the same manner as that of Example 15-3, except that 4-5-difluoro-1,3-dioxolane-2-one (DFEC) as a cyclic ester carbonate having halogen shown in Chemical formula 22 was added as a solvent. The composition of the solvent (PC:FEC:DFEC:DEC) was 30:10:10:50 at a weight ratio.

Examples 15-5

A procedure was performed in the same manner as that of Example 15-3, except that DFEC was used instead of FEC as a solvent. The composition of the solvent (PC:DFEC:DEC) was 40:10:50 at a weight ratio.

When the cycle characteristics were examined for the secondary batteries of Examples 15-1 to 15-5, the results shown in Table 15 were obtained.

TABLE 15

Anode active material: silicon (electron beam evaporation method)
Ten points average height of roughness profile Rz = 3.5 μm
Oxygen content in the anode active material = 3 atomic %

| | Anode active material layer Number of anode active material particle layers (layer) | Coat X | Coat R1 and R2 | Electrolytic solution Solvent (wt %) EC | PC | FEC | DFEC | DEC | Electrolyte salt | Others | Discharge capacity retention ratio (%) |
|---|---|---|---|---|---|---|---|---|---|---|---|
| Example 4-1 | 24 | Chemical formula 1 | Chemical formula 18(1) | 50 | — | — | — | 50 | $LiPF_6$ | — | 90.5 |
| Example 15-1 | | | | — | — | 50 | — | 50 | $LiPF_6$ | — | 91.5 |
| Example 15-2 | | | | — | — | 50 | — | 50 | $LiPF_6$ + $LiBF_4$ | SBAH | 91.6 |
| Example 15-3 | | | | — | 20 | 30 | — | 50 | $LiPF_6$ + $LiBF_4$ | SBAH | 91.8 |
| Example 15-4 | | | | — | 30 | 10 | 10 | 50 | $LiPF_6$ + $LiBF_4$ | SBAH | 92.2 |
| Example 15-5 | | | | — | 40 | — | 10 | 50 | $LiPF_6$ + $LiBF_4$ | SBAH | 92.6 |

As shown in Table 15, in Examples 15-1 to 15-5 in which the electrolytic solution contained other solvent (FEC or the like), other electrolyte salt (lithium tetrafluoroborate), or acid anhydride (SBAH), the discharge capacity retention ratio was higher than that of Example 4-1 in which the electrolytic solution did not contain the foregoing substances. In this case, when the solvent contained DFEC, the discharge capacity retention ratio tended to be higher than that in the case in which the solvent contained FEC. Accordingly, it was confirmed that in the secondary battery of the invention, the cycle characteristics were improved as well when the solvent composition and the electrolyte salt type were changed. It was also confirmed that when other solvent, other electrolyte, or the acid anhydride was added to the electrolytic solution, the cycle characteristics were further improved. Further, it was confirmed that when the cyclic ester carbonate having halogen shown in Chemical formula 22 was contained in the solvent, the cycle characteristics were improved. Furthermore, it was confirmed that as the number of halogen was larger, the characteristics were further improved.

Results in the case that the solvent contained the chain ester carbonate having halogen shown in Chemical formula 21 are not herein shown. However, the chain ester carbonate having halogen shown in Chemical formula 21 has the same function as that of the cyclic ester carbonate having halogen shown in Chemical formula 22. Thus, it is evident that when the solvent contained the chain ester carbonate having halogen shown in Chemical formula 21, similar results may be obtained. The same is applied to a case that a mixture of the same/different types of the both ester carbonates is used.

Example 16-1

A procedure was performed in the same manner as that of Example 4-1, except that the anode active material layer 54B was formed to contain a metal material together with the anode active material. When the metal material was formed, the anode active material was deposited on the both faces of the anode current collector 54A, and then a cobalt plating film was grown on the both faces by electrolytic plating method. As a plating solution, a cobalt plating solution (Nippon Kojundo Kagaku Co., Ltd. make) was used. The current density was in the range from 2 $A/dm^2$ to 5 $A/dm^2$, and the plating rate was 10 nm/sec. Further, the molar ratio M2/M1 between the number of moles M1 per unit area of the anode active material and the number of moles M2 per unit area of the metal material was 1/20.

Examples 16-2 to 16-11

A procedure was performed in the same manner as that of Example 16-1, except that the molar ratio M2/M1 was 1/15 (Example 16-2), 1/10 (Example 16-3), 1/5 (Example 16-4), 1/2 (Example 16-5), 1/1 (Example 16-6), 2/1 (Example 16-7), 3/1 (Example 16-8), 5/1 (Example 16-9), 7/1 (Example 16-10), or 8/1 (Example 16-11) instead of 1/20.

Examples 16-12 to 16-15

A procedure was performed in the same manner as that of Example 16-5, except that an iron plating solution (Example 16-12), a nickel plating solution (Example 16-13), a zinc plating solution (Example 16-14), or a copper plating solution (Example 16-15) was used instead of the cobalt plating solution as a plating solution. The current density was in the range from 2 $A/dm^2$ to 5 $A/dm^2$ in the case of using the iron plating solution, in the range from 2 $A/dm^2$ to 10 $A/dm^2$ in the case of using the nickel plating solution, in the range from 1 $A/dm^2$ to 3 $A/dm^2$ in the case of using the zinc plating solution, and in the range from 2 $A/dm^2$ to 8 $A/dm^2$ in the case of using the copper plating solution. All the foregoing series of plating solutions were made by Nippon Kojundo Kagaku Co., Ltd.

Figure 17:
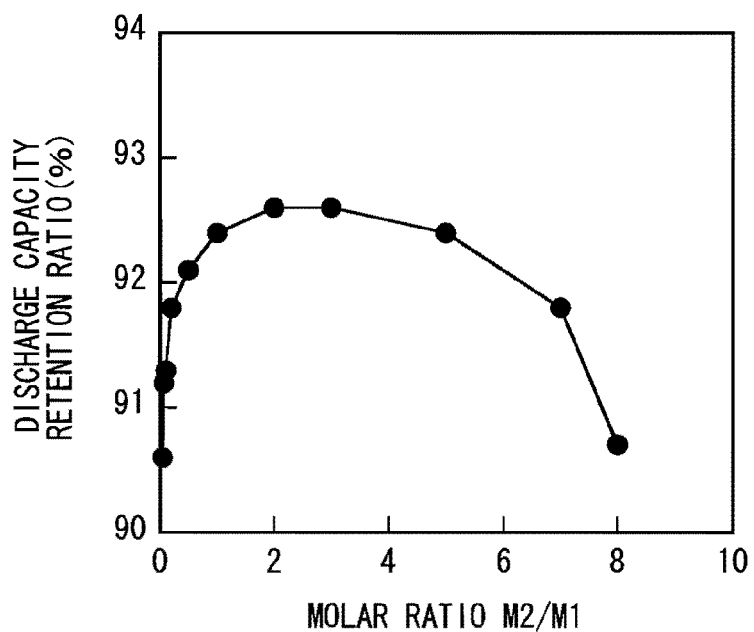
FIG. 17 is a diagram showing a correlation between a molar ratio and a discharge capacity retention ratio.

When the cycle characteristics of the secondary batteries of Examples 16-1 to 16-15 were examined, the results shown in Table 16 and FIG. 17 were obtained.

TABLE 16

Anode active material: silicon (electron beam evaporation method)
Ten points average height of roughness profile Rz = 3.5 μm
Oxygen content in the anode active material = 3 atomic %

| | Anode active material layer | | | | | Discharge capacity retention ratio (%) |
|---|---|---|---|---|---|---|
| | Number of anode active material particle layers (layer) | Metal material | Coat X | Coat R1 and R2 | Molar ratio M2/M1 | |
| Example 4-1 | 24 | — | Chemical formula 1 | Chemical formula 18(1) | — | 90.5 |
| Example 16-1 | | Co | | | 1/20 | 90.6 |
| Example 16-2 | | | | | 1/15 | 91.2 |
| Example 16-3 | | | | | 1/10 | 91.3 |
| Example 16-4 | | | | | 1/5 | 91.8 |
| Example 16-5 | | | | | 1/2 | 92.1 |
| Example 16-6 | | | | | 1/1 | 92.4 |
| Example 16-7 | | | | | 2/1 | 92.6 |
| Example 16-8 | | | | | 3/1 | 92.6 |
| Example 16-9 | | | | | 5/1 | 92.4 |
| Example 16-10 | | | | | 7/1 | 91.8 |
| Example 16-11 | | | | | 8/1 | 90.7 |
| Example 16-12 | | Fe | | | 1/2 | 92 |
| Example 16-13 | | Ni | | | | 91.9 |
| Example 16-14 | | Zn | | | | 91.8 |
| Example 16-15 | | Cu | | | | 91.8 |

As shown in Table 16, in Examples 16-1 to 16-15 in which the metal material was formed, the discharge capacity retention ratio was higher than that of Example 4-1 in which the metal material was not formed. In this case, as shown in Table 16 and FIG. 17, as the molar ratio M2/M1 became larger, the discharge capacity retention ratio tended to be increased and decreased, and if the molar ratio M2/M1 was smaller than 1/15 or larger than 7/1, the discharge capacity retention ratio tended to be largely lowered. Further, when Examples 16-5 and 16-12 to 20-15 having the different metal types were compared to each other, the discharge capacity retention ratio tended to be higher in the case that cobalt was used than in the case that iron, nickel, zinc, or copper was used. Accordingly, it was confirmed that in the secondary battery of the invention, when the metal material not reacting with the electrode reactant was formed, the cycle characteristics were improved. It was also confirmed that if the molar ratio was 1/15 or more and 7/1 or less or when cobalt was used as the metal material, the characteristics were further improved.

Example 17-1

A procedure was performed in the same manner as that of Example 1-1, except that the fluorine resin was contained in the cathode 53 instead of the anode 54. When the fluorine resin was contained in the cathode 53, a coat containing the fluorine resin was formed on the cathode active material layer 53B by a procedure similar to the procedure of forming the coat 54B.

Example 17-2

A procedure was performed in the same manner as that of Example 1-1, except that the fluorine resin was contained in the separator 55 instead of the anode 54. When the fluorine resin was contained in the separator 55, a coat containing the fluorine resin was formed on the both faces of the separator 55 by a procedure similar to the procedure of forming the coat 54B.

Example 17-3

A procedure was performed in the same manner as that of Example 1-1, except that the fluorine resin was contained in the electrolytic solution instead of the anode 54. When the fluorine resin was contained in the electrolytic solution, the fluorine resin was dispersed in the electrolytic solution while the dispersion amount was adjusted to be the same as the content in the coat described above.

Example 17-4

A procedure was performed in the same manner as that of Examples 1-1, except that the fluorine resin was contained in both the anode 54 and the separator 55 by a procedure similar to that of Examples 1-1 and 17-2.

When the cycle characteristics of the secondary batteries of Examples 17-1 to 17-14 were examined, the results shown in Table 17 were obtained.

TABLE 17

Anode active material: silicon (electron beam evaporation method)
Ten points average height of roughness profile Rz: 3.5 μm
Oxygen content in the anode active material: 3 atomic %

| | Anode active material layer Number of anode active material layers (layer) | Coat X | Coat R1 and R2 | Location containing fluorine resin (content form) | Discharge capacity retention ratio (%) |
|---|---|---|---|---|---|
| Example 1-1 | 1 | Chemical formula 1 | Chemical formula 18(1) | Anode (coat) | 88 |
| Example 17-1 | | | | Cathode (coat) | 80 |
| Example 17-2 | | | | Separator (coat) | 81 |
| Example 17-3 | | | | Electrolytic solution (dispersion) | 74 |
| Example 17-4 | | | | Anode + separator | 91 |
| Comparative example 1 | 1 | — | — | — | 45 |

As shown in Table 17, in Examples 17-1 to 17-4 in which the fluorine resin was contained in the cathode 53, the separator 55, or the electrolytic solution or in which the fluorine resin was contained in both the anode 54 and the separator 55, the discharge capacity retention ratio was significantly higher than that of Comparative example 1 as in Example 1-1 in which the fluorine resin was contained in the anode 54. In this case, when comparison was made among Examples 1-1 and 17-1 to 17-3 having the different location containing the fluorine resin, there was a tendency that when the fluorine resin was contained in the cathode 53 or the separator 55, the discharge capacity retention ratio was higher than in the case that the fluorine resin was contained in the electrolytic solution; and when the fluorine resin was contained in the anode 54, the discharge capacity retention ratio was still higher than in the foregoing cases. Further, when comparison was made among Examples 1-1, 17-2, and 17-4 having the different location containing the fluorine resin, there was a tendency that when the fluorine resin was contained in both the anode 54 and the separator 55, the discharge capacity retention ratio was higher than in the case that the fluorine resin was contained in one of the anode 54 and the separator 55.

Though no specific examples have been herein given, it is evident that when the fluorine resin is contained in two or more out of the cathode 53, the anode 54, the separator 55, and the electrolytic solution, the discharge capacity retention ratio may be significantly high as well, for the reason that the discharge capacity retention ratio was significantly high when the fluorine resin was contained in both the anode 54 and the separator 55.

Accordingly, in the secondary battery of the invention, it was confirmed that when the fluorine resin was contained in at least one of the cathode 53, the anode 54, the separator 55, and the electrolytic solution, the cycle characteristics were improved. In this case, it was also confirmed that when the fluorine resin was contained in the anode 54, the characteristics were further improved. In addition, it was confirmed that when the fluorine resin was contained in two or more out of the cathode 53, the anode 54, the separator 55, and the electrolytic solution, the characteristics were further improved.

As evident by the results of the foregoing Table 1 to Table 17 and FIG. 14 to FIG. 17, in the secondary battery of the invention, it was confirmed that when at least one selected from the group consisting of fluorine resins having the structure shown in Chemical formula 1 or Chemical formula 2 was contained in at least one of the cathode, the anode, the separator, and the electrolytic solution, the cycle characteristics were improved. Specially, it was confirmed that when the foregoing fluorine resin was contained in the anode, superior cycle characteristics were obtained without depending on conditions such as the structures of the anode current collector and the anode active material layer, the composition of the electrolytic solution, and the type of battery structure.

In this case, it was confirmed that when the material such as silicon and the tin cobalt alloy (material that can insert and extract lithium and that has at least one of a metal element and a metalloid element) was used, the discharge capacity retention ratio was largely increased than in the case of using the carbon material such as MCMB as an anode active material, and thus higher effects may be obtained in the former case. Such a result may result from the fact that when the silicon or the like advantageous for obtaining a high capacity was used as an anode active material, the electrolytic solution was easily decomposed than in the case of using the carbon material, and thus decomposition prevention effect of the electrolytic solution was significantly demonstrated.

The invention has been described with reference to the embodiment and the examples. However, the invention is not limited to the aspects described in the foregoing embodiment and the foregoing examples, and various modifications may be made. For example, in the foregoing embodiment and the foregoing examples, the descriptions have been given of the lithium ion secondary battery in which the anode capacity is expressed based on insertion and extraction of lithium as a battery type. However, the battery of the invention is not always limited thereto. The invention can be similarly applied to a secondary battery in which the anode capacity includes the capacity associated with insertion and extraction of lithium and the capacity associated with precipitation and dissolution of lithium, and the anode capacity is expressed as the sum of these capacities, by setting the charge capacity of the anode material capable of inserting and extracting lithium to a smaller value than that of the charge capacity of the cathode.

Further, in the foregoing embodiment and the foregoing examples, the description has been given with the specific examples of the square, cylindrical, or laminated film secondary battery as a battery structure, and with the specific example of the battery in which the battery element has the spirally wound structure. However, the invention can be similarly applied to a battery having other structure such as a coin type battery and a button type battery, or a battery in which the battery element has other structure such as a lamination structure.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In these cases, the anode material described in the foregoing embodiment may be used as an anode active material as well.

Further, in the foregoing embodiment and the foregoing examples, regarding the oxygen content in the anode active material in the anode or the battery of the invention, the numerical value range thereof derived from the results of the examples has been described as the appropriate range. However, such a description does not totally eliminate the possibility that the oxygen content may be out of the foregoing range. That is, the foregoing appropriate range is the range particularly preferable for obtaining the effects of the invention. Therefore, as long as effects of the invention are obtained, the oxygen content may be out of the foregoing range in some degrees. The same is applied to the molar ratio M2/M1 or the like in addition to the foregoing oxygen content.

It should be understood by those skilled in the art that various modifications, combinations, sub-combinations and alternations may occur depending on design requirements and other factors insofar as they are within the scope of the appended claims or the equivalents thereof.

What is claimed is:
1. An anode comprising:
an anode current collector;
an anode active material layer on the anode current collector; and
a coating on the anode active material layer,
wherein,
the anode active material layer contains an anode active material containing at least one selected from the group consisting of a simple substance of Si, an alloy of Si, a compound of Si, a simple substance of Sn, an alloy of Sn, and a compound of Sn,
ten points average height of roughness profile Rz of a surface of the anode current collector is 1.5 µm or more and 6.5 µm or less,
the coating contains, except for non-perfluoropolyether resins, one or more fluorine resins each having a structure shown in Chemical formula 1 or Chemical formula 2:

$$\text{---}(\text{OCF}_2\text{---}\text{CF}_2\text{---}\text{CF}_2)_h\text{---}(\text{O---}\text{CF}_2)_k\text{---},\qquad \text{Chemical formula 1}$$

where h and k represent a ratio, and h+k is 1; and

where m and n represent a ratio, and m+n is 1.
2. The anode according to claim 1, wherein the fluorine resin has a structure shown in Chemical formula 3:

$$\text{R1-X---R2},\qquad \text{Chemical formula 3}$$

where X is a structure shown in Chemical formula 1 or Chemical formula 2, and at least one of R1 and R2 is a group capable of being fixed on the surface of the anode active material layer.

3. The anode according to claim 2, wherein at least one of R1 and R2 shown in Chemical formula 3 is a hydroxyl group, an ester group, a silane group, an alkoxysilane group, a phosphate group, an amino group, an amide group, a cyano group, or an isocyanate group.

4. The anode according to claim 2, wherein at least one of R1 and R2 shown in Chemical formula 3 has a structure shown in Chemical formula 4:

$$\text{---}(\text{O})_p\text{---}(\text{R3})_q\text{---}(\text{R4})_r\text{R5},\qquad \text{Chemical formula 4}$$

where p, q, and r are 0 or 1, R3 is a divalent linked group shown in Chemical formula 5, R4 is a divalent linked group shown in Chemical formula 6 or Chemical formula 7, and R5 is a monovalent group shown in Chemical formula 8 to Chemical formula 17:

$$\text{---}(\text{CF}_2)_n\text{---},\qquad \text{Chemical formula 5}$$

where n is one of integer numbers 1 or higher;

$$\text{---}(\text{CH}_2)_n\text{---},\qquad \text{Chemical formula 6}$$

where n is one of integer numbers 1 or higher;

$$\text{---}(\text{O---CH}_2\text{---CH}_2)_n\text{OE},\qquad \text{Chemical formula 8}$$

where n is one of integer numbers 0 to 10;

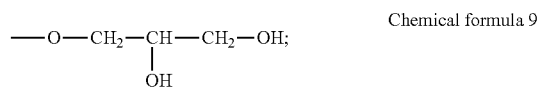

where R6 is a hydrogen group, an alkyl group having a carbon number of 10 or less, or —CH$_2$—CN;

where R7 and R8 are a hydrogen group or an alkyl group having a carbon number of 20 or less;

where R9 to R11 are a hydrogen group, a halogen group, an alkyl group having a carbon number of 10 or less, an alkylene group having a carbon number of 10 or less, or an alkoxyl group having a carbon number of 10 or less;

Chemical formula 13

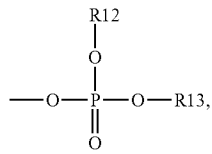

where R12 and R13 are a hydrogen group, a hydroxyl group, a halogen group, or an alkyl group having a carbon number of 10 or less:

Chemical formula 14

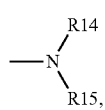

where R14 and R15 are a hydrogen group or an alkyl group having a carbon number of 10 or less:

—N=C=O;  Chemical formula 15

Chemical formula 16

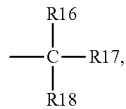

where R16 to R18 are a hydrogen group or a halogen group; and

—C≡N,  Chemical formula 17

5. The anode according to claim 1, wherein the anode active material contains oxygen, and a content of the oxygen in the anode active material is 3 atomic % or more and 40 atomic % or less.

6. The anode according to claim 1, wherein the anode active material has an oxygen-containing region that has oxygen in the thickness direction, and a content of the oxygen in the oxygen-containing region is higher than a content of oxygen in other regions.

7. The anode according to claim 1, wherein the anode active material has at least one metal element selected from the group consisting of iron (Fe), cobalt (Co), nickel (Ni), chromium (Cr), titanium (Ti), and molybdenum (Mo).

8. The anode according to claim 1, wherein the anode active material is composed of a plurality of particles.

9. The anode according to claim 8, wherein the particles of the anode active material have a multilayer structure in the particles.

10. The anode according to claim 8, wherein the anode active material is linked to the anode current collector.

11. The anode according to claim 8, wherein the anode active material is formed by vapor-phase deposition method.

12. The anode according to claim 9, wherein the anode active material layer has a metal material not being alloyed with an electrode reactant in a gap between the particles of the anode active material.

13. The anode according to claim 12, wherein the anode active material layer has the metal material on an exposed face of the particles of the anode active material.

14. The anode according to claim 12, wherein the anode active material layer has the metal material in a gap in the particles of the anode active material.

15. The anode according to claim 12, wherein the metal material has at least one metal element selected from the group consisting of iron, cobalt, nickel, zinc (Zn), and copper (Cu).

16. The anode according to claim 12, wherein the metal material is formed by liquid-phase deposition method.

17. The anode according to claim 12, wherein molar ratio M2/M1 between the number of moles M1 per unit area of the anode active material and the number of moles M2 per unit area of the metal material is 1/15 or more and 7/1 or less.

* * * * *